United States Patent
Anzai et al.

(10) Patent No.: US 11,524,267 B2
(45) Date of Patent: Dec. 13, 2022

(54) RESISTIVITY VALUE REGULATING DEVICE AND RESISTIVITY VALUE REGULATING METHOD

(71) Applicant: DIC Corporation, Tokyo (JP)

(72) Inventors: Daijirou Anzai, Ichihara (JP); Naoki Hada, Ichihara (JP); Kazumi Oi, Ichihara (JP)

(73) Assignee: DIC Corporation, Tokyo (JP)

( * ) Notice: Subject to any disclaimer, the term of this patent is extended or adjusted under 35 U.S.C. 154(b) by 665 days.

(21) Appl. No.: 16/468,049

(22) PCT Filed: Dec. 15, 2017

(86) PCT No.: PCT/JP2017/045145
§ 371 (c)(1),
(2) Date: Jun. 10, 2019

(87) PCT Pub. No.: WO2018/116987
PCT Pub. Date: Jun. 28, 2018

(65) Prior Publication Data
US 2020/0016549 A1    Jan. 16, 2020

(30) Foreign Application Priority Data

Dec. 20, 2016  (JP) .............................. JP2016-246478

(51) Int. Cl.
| | |
|---|---|
| *B01F 21/00* | (2022.01) |
| *B01F 21/10* | (2022.01) |
| *G05D 7/01* | (2006.01) |
| *B01F 25/52* | (2022.01) |
| *B01F 35/80* | (2022.01) |

(52) U.S. Cl.
CPC .............. *B01F 21/10* (2022.01); *B01F 25/52* (2022.01); *G05D 7/01* (2013.01); *B01F 35/80* (2022.01)

(58) Field of Classification Search
CPC .......... B01F 21/10; B01F 25/52; B01F 35/80; G05D 7/01
See application file for complete search history.

(56) References Cited

U.S. PATENT DOCUMENTS

2006/0207777 A1    9/2006  Kim et al.
2015/0380280 A1    12/2015 Amiya et al.

FOREIGN PATENT DOCUMENTS

| CN | 101244863 A | 8/2008 |
|---|---|---|
| GB | 2537678 | * 10/2016 |
| GB | 2537678 A | 10/2016 |
| JP | 2001-205063 A | 7/2001 |

(Continued)

OTHER PUBLICATIONS

JP 2003010660 to Oi (Year: 2003).*

(Continued)

*Primary Examiner* — Anshu Bhatia
(74) *Attorney, Agent, or Firm* — Locke Lord LLP; James E. Armstrong, IV; Nicholas J. DiCeglie, Jr.

(57) ABSTRACT

A resistivity regulating apparatus includes: a gas dissolving device that causes a regulating gas to dissolve in a liquid targeted for resistivity regulation to generate a treated liquid in which the regulating gas is dissolved in the liquid, the regulating gas being used to regulate a resistivity of the liquid; and a buffer tank to which the treated liquid discharged from the gas dissolving device is fed.

13 Claims, 24 Drawing Sheets

(56) References Cited

FOREIGN PATENT DOCUMENTS

| JP | 2002-292362 A | 10/2002 |
|----|---------------|---------|
| JP | 2003-010660 A | 1/2003 |
| JP | 2004-344821 A | 12/2004 |
| JP | 3690569 B2 | 8/2005 |
| JP | 2006-261674 A | 9/2006 |
| JP | 3951385 B2 | 8/2007 |
| JP | 2012-223725 A | 11/2012 |
| JP | 2015-213145 A | 11/2015 |
| WO | 2016/167134 A1 | 10/2016 |

OTHER PUBLICATIONS

Office Action dated Dec. 10, 2020, issued for TW Patent Application No. 106144333.
Supplementary European Search Report dated Jun. 3, 2020, issued for European Patent Application No. 17885313.1.
International Search Report dated Jan. 30, 2018, issued for PCT/JP2017/045145.
International Preliminary Report on Patentability and dated Jun. 25, 2019 and an English translation of Written Opinion of the International Searching Authority dated Jan. 30, 2018, issued for issued for PCT/JP2017/045145.

\* cited by examiner

*Fig.3*
(a)
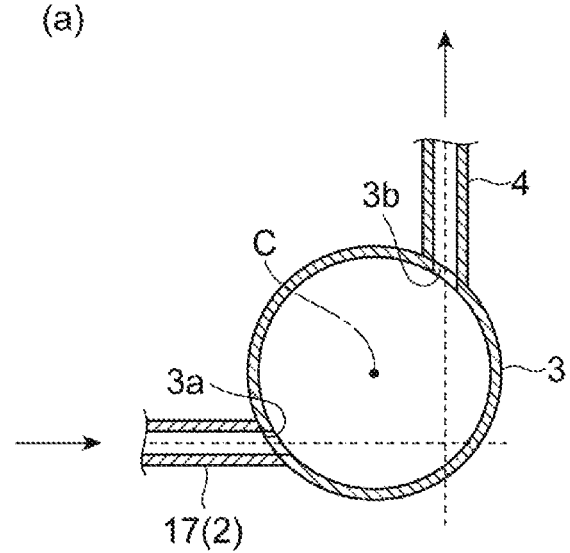
(b)
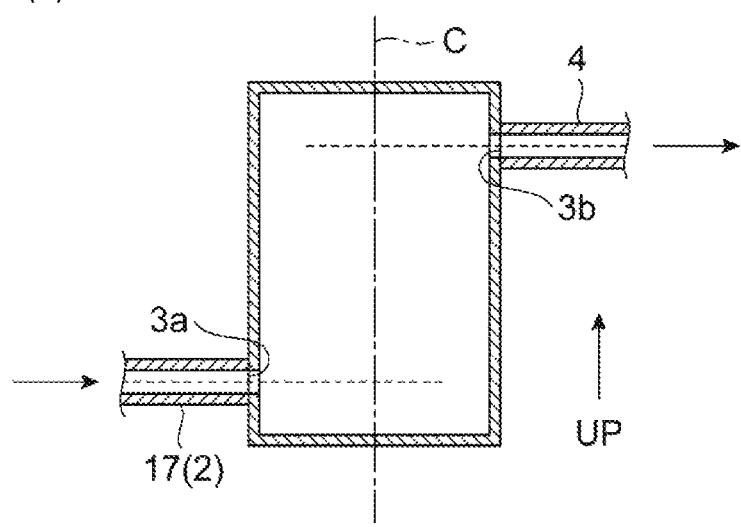

RESISTIVITY VALUE REGULATING DEVICE AND RESISTIVITY VALUE REGULATING METHOD

TECHNICAL FIELD

The present invention relates to a resistivity regulating apparatus that regulates the resistivity of liquid and a resistivity regulating method.

BACKGROUND ART

In the process for producing semiconductors or liquid crystals, ultrapure water is used to clean substrates. In this case, ultrapure water with high resistivity generates static electricity. This causes dielectric breakdown or redeposition of fine particles and exerts a significantly adverse effect on the product yield. To solve such a problem, there is proposed a technique using a hydrophobic hollow fiber membrane module. This technique involves dissolving a gas, such as carbon dioxide gas or ammonia gas, in ultrapure water by using a hollow fiber membrane module. Ions are generated due to dissociation equilibrium, and the generated ions reduce the resistivity of ultrapure water to form treated water.

In a process such as a substrate cleaning process or a dicing process, the flow of ultrapure water fluctuates significantly. PTL 1 proposes a resistivity regulating apparatus that stabilizes resistivity even if the flow rate fluctuates. The resistivity regulating apparatus described in PTL 1 includes a hollow fiber membrane module that generates a small volume flow of high-concentration-gas-added ultrapure water, and a bypass conduit through which a large volume flow of ultrapure water passes. The high-concentration-gas-added ultrapure water generated in the hollow fiber membrane module merges with the ultrapure water that has passed through the bypass conduit to generate treated water for cleaning substrates.

CITATION LIST

Patent Literature

PTL 1: Japanese Patent No. 3951385

SUMMARY OF INVENTION

Technical Problem

By the way, the gas dissolved in ultrapure water is dissociated (ionized) in two steps provided by the following equation (1) and equation (2). In the following equations, carbon dioxide gas is used as gas.

$$H_2O + CO_2 = H^+ + HCO_3^- \tag{1}$$

$$HCO_3^- = H^+ + CO_3^- \tag{2}$$

However, the dissociation of the gas dissolved in ultrapure water progresses gradually. For example, in the case of using the resistivity regulating apparatus described in PTL 1, the ionization of equation (1) is almost completed at a stage when the gas is dissolved in ultrapure water in the hollow fiber membrane module, but it takes a time to perform the ionization of equation (2). Thus, there is a problem in which, at the pipe downstream of the resistivity regulating apparatus, deviations (differences) arise between the resistivity of treated water measured near the resistivity regulating apparatus and the resistivity of treated water measured several meters downstream of the resistivity regulating apparatus.

There is also a problem in which fluctuations in resistivity occur due to uneven ion concentrations in the treated water. For example, in the case of using the resistivity regulating apparatus described in PTL 1, ultrapure water merges with gas-added ultrapure water, and the ion concentration of the treated water becomes uneven depending on the mixed state of ultrapure water and gas-added ultrapure water.

These two problems tend to become more apparent as the resistivity regulated value, which is a regulated value of resistivity, increases.

As a measure to solve these two problems, a long pipe may be disposed downstream of the resistivity regulating apparatus so that treated water is naturally mixed and dissociated during flowing through the pipe.

However, the following problems arise in using the long pipe: for example, (1) a large pressure drop of the pipe, (2) a need of a space for storing the long pipe, and (3) a failure to completely eliminate deviations and fluctuations in resistivity due to the limitation of the pipe length.

In light of the foregoing circumstances, an object of the present invention is to provide a resistivity regulating apparatus and a resistivity regulating method with which the deviations and fluctuations in the resistivity of treated water can be both reduced while scale expansion is avoided.

Solution to Problem

A resistivity regulating apparatus according to an aspect of the present invention includes a gas dissolving device that causes a regulating gas to dissolve in a liquid targeted for resistivity regulation to generate a treated liquid in which the regulating gas is dissolved in the liquid, the regulating gas being used to regulate a resistivity of the liquid; and a buffer tank to which the treated liquid discharged from the gas dissolving device is fed.

In the resistivity regulating apparatus, the gas dissolving device generates the treated liquid in which the regulating gas is dissolved in the liquid, and the generated treated liquid is fed to the buffer tank. When the treated liquid is fed to the buffer tank, the flow path of the treated liquid widens rapidly, and the flow rate of the treated liquid thus drops rapidly. This causes the treated liquid fed to the buffer tank to undergo convection in the buffer tank, which promotes dissociation of the treated liquid. The treated liquid fed to the buffer tank is stirred in the form of turbulent flow in the buffer tank, which promotes uniformization of ion concentration. As a result, the deviations and fluctuations in the resistivity of the treated liquid are both reduced. In addition, the pressure drop of the treated liquid can be reduced, and the apparatus scale can also be reduced, compared with the case of using a long pipe instead of a buffer tank.

The buffer tank may be a cylindrical container. Since the buffer tank is a cylindrical container in the resistivity regulating apparatus, the treated, liquid fed to the buffer tank can undergo convection along the inner circumferential surface of the buffer tank. This configuration can ensure a sufficient convection time for the treated liquid in the buffer tank and can improve the stirring effect.

The buffer tank may have a feed port for feeding the treated liquid and a discharge port for discharging the treated liquid, and the feed port and the discharge port may be directed along lines different from each other. Since the feed port and the discharge port of the buffer tank are directed along lines different from each other in the resistivity regulating apparatus, a large turbulent flow is generated in a buffer tank, and the pathway from the feed port to the discharge port becomes complicated. This configuration can promote the convection and stirring of the treated liquid.

The feed port and the discharge port may be directed toward positions off the central axis extending in the vertical direction of the buffer tank. Since the feed port and the discharge port of the buffer tank are directed toward positions off the central axis extending in the vertical direction of the buffer tank in the resistivity regulating apparatus, the treated liquid can be swirled in the buffer tank around the central axis of the buffer tank. This configuration can ensure a sufficient convection time for the treated liquid in the buffer tank and can improve the stirring effect.

The feed port and the discharge port may be disposed in different positions in the vertical direction of the buffer tank. Since the feed port and the discharge port are disposed in different positions in the vertical direction of the buffer tank in the resistivity regulating apparatus, a sufficient convection time for the treated liquid in the buffer tank can be ensured.

The discharge port may be disposed higher than the feed port. Since the discharge port is disposed higher than the feed port in the resistivity regulating apparatus, the air bubbles in the treated liquid can be discharged readily from the treated liquid.

The feed port may be formed in an upper part of the buffer tank. Since the feed port is formed in an upper part of the buffer tank in the resistivity regulating apparatus, the treated liquid stored in the buffer tank can be stirred by the treated liquid fed to the buffer tank from the feed port.

By the way, the experiment carried out by the inventors of the present invention leads to the finding that it takes about 7 to 12 seconds to sufficiently perform the ionization of equation (2). The capacity of the buffer tank may be such that the buffer tank is filled with the treated liquid in 7 to 12 seconds. Since the capacity of the buffer tank is such that the buffer tank is filled with the treated liquid in 7 to 12 seconds, that is, the buffer tank has the capacity corresponding to the flow of the treated liquid for 7 to 12 seconds, in the resistivity regulating apparatus, the buffer tank can be prevented from increasing in size, and the treated liquid can dissociate well in the buffer tank.

The resistivity regulating apparatus may further include: a treated-liquid discharge pipe through which the treated liquid is discharged from the buffer tank; a pump that is attached to the treated-liquid discharge pipe and delivers the treated liquid; an on-off valve that is attached to the treated-liquid discharge pipe downstream of the pump and opens and closes the treated-liquid discharge pipe; and a circulation pipe that diverges from the treated-liquid discharge pipe between the pump and the on-off valve and returns the treated liquid flowing through the treated-liquid discharge pipe to the buffer tank. In the resistivity regulating apparatus, the treated liquid can be fed to a use point from the treated-liquid discharge pipe when the on-off valve is opened, and the treated liquid discharged from the buffer tank to the treated-liquid discharge pipe can be returned to the buffer tank from the circulation pipe when the on-off valve is closed. When the treated liquid is not needed at a use point, the treated liquid can be circulated between the buffer tank, the treated-liquid discharge pipe, and the circulation pipe by closing the on-off valve. This configuration further promotes the dissociation of the treated liquid and the uniformization of ion concentration and, therefore, further reduces the deviations and fluctuations in the resistivity of the treated liquid.

By the way, a cleaning machine for cleaning a substrate or other machine frequently causes flow rate fluctuations and thus gives rise to problems associated with fluctuations in resistivity caused by flow changes. If the flow rate is changed, it takes some time to stabilize the resistivity of the treated liquid. Since the treated liquid stored in the buffer tank is fed to a use point in the resistivity regulating apparatus, it is not necessary to always generate the treated liquid in the gas dissolving device, and it is necessary to generate the treated liquid in the gas dissolving device only when the treated liquid stored in the buffer tank runs short. The liquid can thus be fed to the gas dissolving device at a constant flow rate. Therefore, the resistivity of the treated liquid can be stabilized without being affected by the flow rate fluctuations and the amount of the treated liquid used at a use point.

The buffer tank may have a circulation port through which the treated liquid is fed from the circulation pipe, and the circulation port may be formed in an upper part of the buffer tank. Since the circulation port is formed in an upper part of the buffer tank in the resistivity regulating apparatus, the treated liquid stored in the buffer tank can be stirred by the treated liquid fed to the buffer tank from the circulation port.

The gas dissolving device may include a hollow fiber membrane module in which a hollow fiber membrane separates a liquid phase-side region fed with the liquid from a gas phase-side region fed with the regulating gas and in which the regulating gas having passed through the hollow fiber membrane is dissolved in the liquid to generate a high-concentration-gas-added liquid; a liquid feed pipe through which the liquid is fed; a module feed pipe that communicates with the liquid feed pipe through a diversion section at which the module feed pipe diverges from the liquid feed pipe so as to feed the liquid to the hollow fiber membrane module; a module discharge pipe through which the high-concentration-gas-added liquid is discharged from the hollow fiber membrane module; a bypass pipe that communicates with the liquid feed pipe through the diversion section and bypasses the hollow fiber membrane module; and a liquid discharge pipe that communicates with the module discharge pipe and the bypass pipe through a merge section at which the module discharge pipe merges with the bypass pipe. In the resistivity regulating apparatus, the liquid fed to the gas dissolving device is divided into the liquid that is fed to the hollow fiber membrane module and the liquid that bypasses the hollow fiber membrane module. In the hollow fiber membrane module, the regulating gas that has passed through the hollow fiber membrane is dissolved in the liquid to generate a high-concentration-gas-added liquid in which the regulating gas is dissolved in the liquid. Then, the high-concentration-gas-added liquid generated in the hollow fiber membrane module merges with the liquid that has bypassed the hollow fiber membrane module to generate the treated liquid. This configuration can stabilize the resistivity of the treated liquid even if the flow rate of the liquid fed to the gas dissolving device fluctuates.

The resistivity regulating apparatus may further include a first regulation pipe through which the liquid is fed to the buffer tank; a second regulation pipe through which the high-concentration-gas-added liquid is fed to the buffer tank; and a resistivity sensor that measures a resistivity of the treated liquid in the buffer tank. In the resistivity regulating apparatus, the resistivity of the treated liquid stored in the buffer tank can be regulated by feeding the liquid or the high-concentration-gas-added liquid to the buffer tank from the first regulation pipe or the second regulation pipe on the basis of the result of the measurement with the resistivity sensor. Even when the liquid or the high-concentration-gas-added liquid is fed to the buffer tank, the dissociation and the uniformization of ion concentration of the treated liquid can be promoted by closing the on-off valve and circulating the treated liquid between the buffer tank, the treated-liquid discharge pipe, and the circulation pipe.

A resistivity regulating method according to an aspect of the present invention includes: causing a regulating gas to dissolve in a liquid targeted for resistivity regulation to generate a treated liquid in which the regulating gas is dissolved in the liquid, the regulating gas being used to regulate a resistivity of the liquid; and feeding the generated treated liquid to a buffer tank.

The resistivity regulating method involves generating the treated liquid in which the regulating gas is dissolved in the liquid, and feeding the generated treated liquid to the buffer tank. When the treated liquid is fed to the buffer tank, the flow path of the treated liquid widens rapidly, and the flow rate of the treated liquid thus drops rapidly. This causes the treated liquid fed to the buffer tank to undergo convection in the buffer tank, which promotes dissociation of the treated liquid. The treated liquid fed to the buffer tank is stirred in the form of turbulent flow in the buffer tank, which promotes uniformization of ion concentration. As a result, the deviations and fluctuations in the resistivity of the treated liquid are both reduced. In addition, the pressure drop of the treated liquid can be reduced, and the apparatus scale can also be reduced, compared with the case where the treated liquid flows through a long pipe instead of a buffer tank.

Advantageous Effects of Invention

According to the present invention, the deviations and fluctuations in the resistivity of treated water can be reduced while scale expansion is avoided.

BRIEF DESCRIPTION OF DRAWINGS

FIG. 3(a) and FIG. 3(b) illustrate example arrangements of a feed port and a discharge port of a buffer tank.

DESCRIPTION OF EMBODIMENTS

Figure 1:
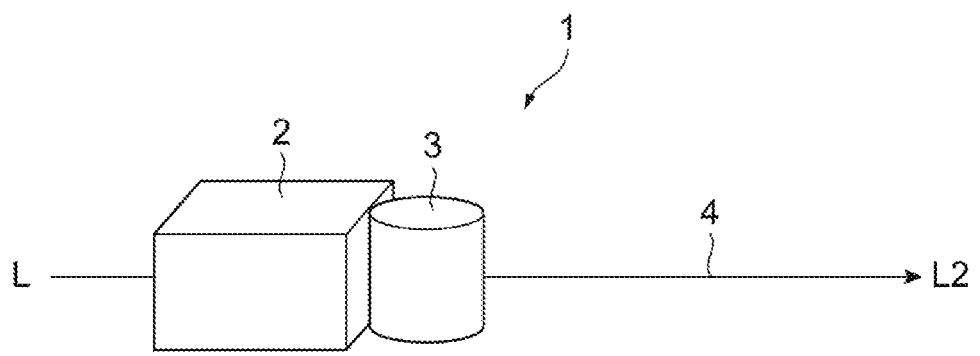
FIG. 1 is a schematic view of a resistivity regulating apparatus in a first embodiment.

A resistivity regulating apparatus and a resistivity regulating method in embodiments will be described below in detail with reference to the drawings. The same parts or corresponding parts are denoted by the same reference characters throughout the drawings, and overlapping description is omitted.

First Embodiment

FIG. 1 is a schematic view of a resistivity regulating apparatus in a first embodiment. As illustrated in FIG. 1, a resistivity regulating apparatus 1 in this embodiment includes a gas dissolving device 2, a buffer tank 3, and a treated-liquid discharge pipe 4.

The gas dissolving device 2 causes a regulating gas G to dissolve in a liquid L targeted for resistivity regulation to generate a treated liquid L2 in which the regulating gas G is dissolved in the liquid L, the regulating gas G being used to regulate the resistivity of the liquid L.

Figure 2:
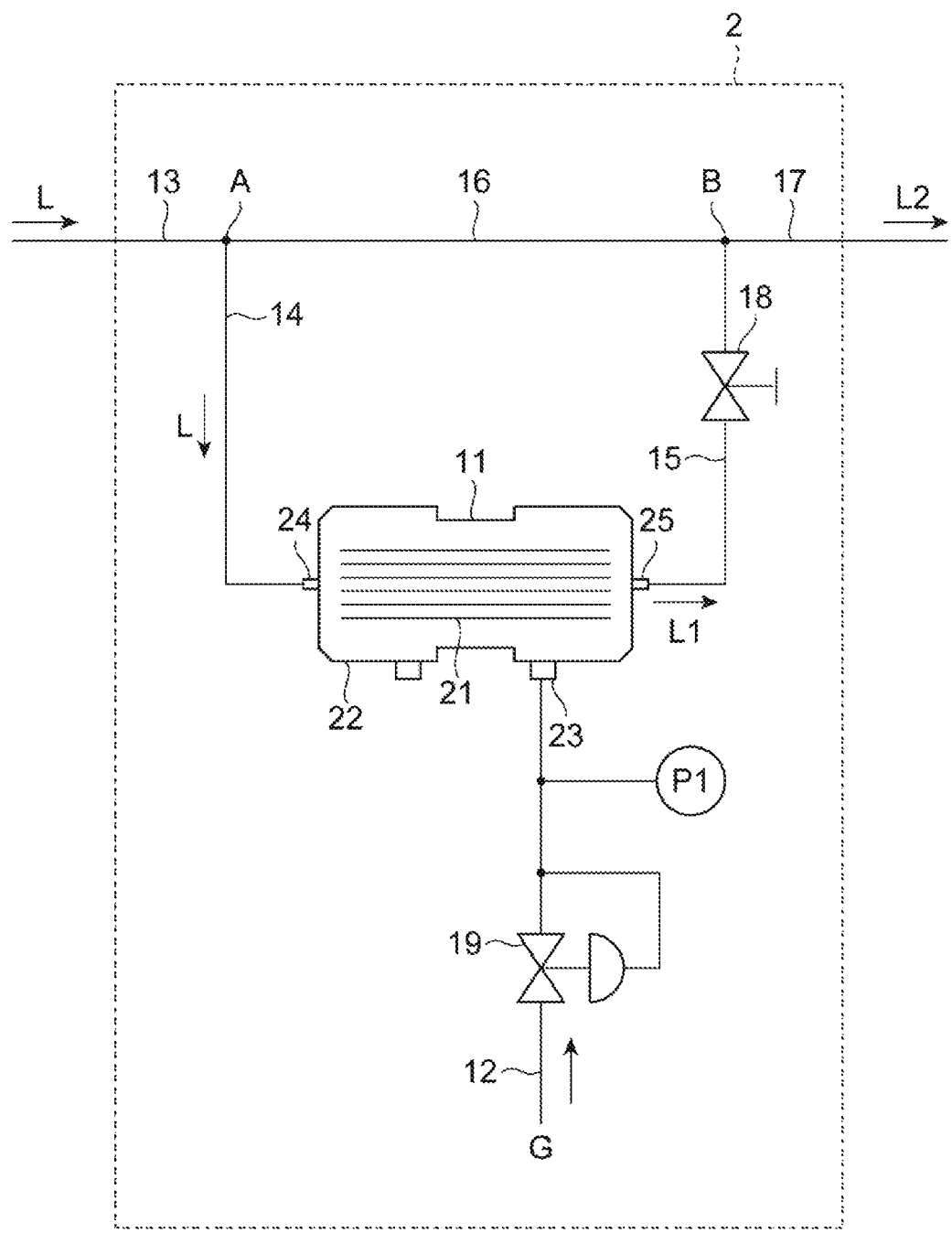
FIG. 2 is a schematic view of a gas dissolving device.

FIG. 2 is a schematic view of the gas dissolving device. As illustrated in FIG. 2, the gas dissolving device 2 includes a hollow fiber membrane module 11, a gas feed pipe 12, a liquid feed pipe 13, a module feed pipe 14, a module discharge pipe 15, a bypass pipe 16, a liquid discharge pipe 17, and a regulating valve 18.

In the hollow fiber membrane module 11, the regulating gas G used to regulate the resistivity of the liquid L is dissolved in the liquid L targeted for resistivity regulation. The liquid used as the liquid L is not limited, but may be, for example, ultrapure water for cleaning semiconductors, liquid crystals, or the like. The resistivity of ultrapure water is typically in the range from 17.5 [MΩ·cm] to 18.2 [MΩ·cm]. The gas used as the regulating gas G is not limited, but may be, for example, carbon dioxide gas or ammonia gas. The hollow fiber membrane module 11 includes plural hollow fiber membranes 21 and a housing 22, which contains the hollow fiber membranes 21 inside.

The hollow fiber membrane 21 allows gas to pass therethrough but does not allow liquid to pass therethrough. The materials, shape, form, and other features of the hollow fiber membrane 21 are not limited. The housing 22 is a closed container that contains the hollow fiber membranes 21 inside.

The region in the housing 22 of the hollow fiber membrane module 11 is divided into a liquid phase-side region and a gas phase-side region by the hollow fiber membrane 21. The liquid phase-side region is a region fed with the liquid L in the region in the housing 22 of the hollow fiber membrane module 11. The gas phase-side region is a region fed with the regulating gas G in the region in the housing 22 of the hollow fiber membrane module 11. The hollow fiber membrane module 11 comes in two systems: internal flow system and external flow system. In this embodiment, the hollow fiber membrane module 11 may be of either the internal flow system or the external flow system. In the hollow fiber membrane module 11 of the external flow system, a gas phase-side region is present on the inside (inner surface side) of the hollow fiber membrane 21, and a liquid phase-side region is present on the outside (outer surface side) of the hollow fiber membrane 21. In the hollow fiber membrane module 11 of the internal flow system, a liquid phase-side region is present on the inside (inner surface side) of the hollow fiber membrane 21, and a gas phase-side region is present on the outside (outer surface side) of the hollow fiber membrane 21.

In the hollow fiber membrane module 11, the regulating gas G that has passed through the hollow fiber membrane 21 is dissolved in the liquid L to generate a high-concentration-gas-added liquid L1 in which the regulating gas G is dissolved in the liquid L. At this time, for example, a regulating gas-saturated liquid in which the regulating gas G is dissolved in the liquid L in a saturated state is preferably generated as the high-concentration-gas-added liquid L1 by maintaining constant the pressure of the regulating gas G fed to the hollow fiber membrane module 11 to regulate the flow rate of the liquid L fed to the hollow fiber membrane module 11. The flow rate of the liquid L fed to the hollow fiber membrane module 11 can be regulated with the regulating valve 18. In the gas dissolving device 2, the ionization of equation (1) is almost completed at a stage when the hollow fiber membrane module 11 generates the high-concentration-gas-added liquid L1.

The housing 22 has a gas feed port 23, a liquid feed port 24, and a liquid discharge port 25. The gas feed port 23 is an opening formed on the housing 22 to feed the regulating gas G to the gas phase-side region. The liquid feed port 24 is an opening formed on the housing 22 to feed the liquid L to the liquid phase-side region. The liquid discharge port 25 is an opening formed on the housing 22 to discharge the high-concentration-gas-added liquid L1 from the liquid phase-side region. Therefore, the gas feed port 23 communicates with the gas phase-side region, and the liquid feed port 24 and the liquid discharge port 25 communicate with the liquid phase-side region. The positions of the gas feed port 23, the liquid feed port 24, and the liquid discharge port 25 are not limited.

The gas feed pipe 12 is a tubular member having a flow path on its inner circumferential side. The gas feed pipe 12 is connected to the gas feed port 23. The gas feed pipe 12 communicates with the gas phase-side region of the hollow fiber membrane module 11. The regulating gas G is fed to the gas phase-side region of the hollow fiber membrane module 11 through the gas feed pipe 12.

A pressure regulating valve 19 and a pressure gauge P1 are connected to the gas feed pipe 12. The pressure regulating valve 19 regulates the pressure of the regulating gas G flowing through the gas feed pipe 12. In other words, the pressure of the regulating gas G in the gas phase-side region is regulated by the pressure regulating valve 19. Various well-known pressure regulating valves can be used as the pressure regulating valve 19. The pressure gauge P1 measures the pressure of the regulating gas G flowing through the gas feed pipe 12. The pressure gauge P1 is connected to the gas feed pipe 12 downstream of the pressure regulating valve 19, that is, the gas feed pipe 12 close to the gas phase-side region with respect to the pressure regulating valve 19. Various well-known pressure gauges can be used as the pressure gauge P1, and the pressure gauge P1 may be, for example, a diaphragm valve. A controller (not shown) that controls the resistivity regulating apparatus 1 controls the pressure regulating valve 19 on the basis of the pressure of the regulating gas G measured with the pressure gauge P1 such that the pressure of the regulating gas G flowing through the gas feed pipe 12, that is, the pressure of the regulating gas G in the gas phase-side region, becomes a predetermined value (or falls in a predetermined range).

This embodiment describes that the regulating gas G is not discharged from the gas phase-side region of the hollow fiber membrane module 11, but the regulating gas G may be discharged from the gas phase-side region of the hollow fiber membrane module 11. In this case, the housing 22 of the hollow fiber membrane module 11 has a gas discharge port (not shown), which is an opening for discharging the regulating gas G from the gas phase-side region. A gas discharge pipe (not shown) through which the regulating gas G is discharged from the gas phase-side region of the hollow fiber membrane module 11 is connected to the gas discharge port. The gas discharge pipe is a tubular member having a flow path on its inner circumferential side.

The liquid feed pipe 13 is a tubular member having a flow path on its inner circumferential side. The total volume of the liquid L to be fed to the resistivity regulating apparatus 1 is fed to the liquid feed pipe 13. The liquid feed pipe 13 diverges into the module feed pipe 14 and the bypass pipe 16 at the diversion section A. In other words, the liquid feed pipe 13 is connected upstream of the diversion section A, and the module feed pipe 14 and the bypass pipe 16 are connected downstream of the diversion section A. The diversion section A discharges the liquid L flowing through the liquid feed pipe 13 such that the liquid L diverges into the module feed pipe 14 and the bypass pipe 16.

The module feed pipe 14 is a tubular member having a flow path on its inner circumferential side. The module feed pipe 14 communicates with the liquid feed pipe 13 through the diversion section A. The liquid L is fed to the hollow fiber membrane module 11 through the module feed pipe 14. The module feed pipe 14 is disposed upstream of the hollow fiber membrane module 11 and is connected to the liquid feed port 24 of the hollow fiber membrane module 11. The module feed pipe 14 communicates with the liquid phase-side region of the hollow fiber membrane module 11. The liquid L is fed to the liquid phase-side region of the hollow fiber membrane module 11 through the module feed pipe 14.

The module discharge pipe 15 is a tubular member having a flow path on its inner circumferential side. The high-concentration-gas-added liquid L1 is discharged from the hollow fiber membrane module 11 through the module discharge pipe 15 and communicates with the liquid discharge pipe 17 through the merge section B. The module discharge pipe 15 is disposed downstream of the hollow fiber membrane module 11 and connected to the liquid discharge port 25 of the hollow fiber membrane module 11. The module discharge pipe 15 communicates with the liquid phase-side region of the hollow fiber membrane module 11, and the high-concentration-gas-added liquid L1 is discharged from the liquid phase-side region of the hollow fiber membrane module 11 through the module discharge pipe 15.

The bypass pipe 16 is a tubular member having a flow path on its inner circumferential side. The bypass pipe 16 communicates with the liquid feed pipe 13 through the diversion section A. The bypass pipe 16 bypasses the hollow fiber membrane module 11. The liquid L flowing through the bypass pipe 16 thus bypasses the hollow fiber membrane module 11 without being fed to the hollow fiber membrane module 11. The bypass pipe 16 merges with the module discharge pipe 15 at the merge section B.

The module discharge pipe 15 and the bypass pipe 16 are connected upstream of the merge section B. The liquid discharge pipe 17 is connected downstream of the merge section B. At the merge section B, the high-concentration-gas-added liquid L1 flowing through the module discharge pipe 15 merges with the liquid L flowing through the bypass pipe 16. At the merge section B, the treated liquid L2 formed by the merge of the liquid L and the high-concentration-gas-added liquid L1 is discharged to the liquid discharge pipe 17.

The liquid discharge pipe 17 is a tubular member having a flow path on its inner circumferential side. The liquid discharge pipe 17 is connected to the merge section B, the liquid discharge pipe 17 communicates with the module discharge pipe 15 and the bypass pipe 16 through the merge section B, and the treated liquid L2 is discharged from the merge section B through the liquid discharge pipe 17.

The regulating valve 18 is a valve that opens and closes the flow path of the module discharge pipe 15. The regulating valve 18 opens and closes the flow path of the module discharge pipe 15 to control the ratio of the high-concentration-gas-added liquid L1 flowing through the module discharge pipe 15 to the liquid L flowing through the bypass pipe 16. In other words, the resistivity of the treated liquid L2 can be regulated by controlling the above-described ratio with the regulating valve 18. In this case, the degree of opening of the regulating valve 18 is preferably set so as to generate the high-concentration-gas-added liquid L1 in which the regulating gas G is dissolved in the liquid L in a saturated state. The saturated state here includes not only a completely saturated state but also a nearly saturated state. The nearly saturated state here means the state in which the regulating gas G is dissolved in the liquid L to such an extent that the resistivity of the liquid L can be regulated on the basis of only the distribution ratio of the flow rate of the liquid L fed to the hollow fiber membrane module 11 to the flow rate of the liquid L bypassing the hollow fiber membrane module 11.

As illustrated in FIG. 1, the treated liquid L2 discharged from the gas dissolving device 2 is fed to the buffer tank 3. The buffer tank 3 is connected to the gas dissolving device 2. In other words, the treated liquid L2 when discharged from the gas dissolving device 2 is immediately fed to the buffer tank 3 without flowing through the treated-liquid discharge pipe 4. The buffer tank 3 is a container that can temporarily store the treated liquid L2. When the treated liquid L2 is fed to the buffer tank 3, the flow path of the treated liquid L2 widens rapidly, and the flow rate of the treated liquid L2 thus drops rapidly. This causes the treated liquid L2 fed to the buffer tank 3 to undergo convection in the buffer tank 3, which promotes dissociation of the treated liquid L2. The treated liquid L2 fed to the buffer tank 3 is stirred in the form of turbulent flow in the buffer tank 3, which promotes uniformization of ion concentration.

The buffer tank 3 is a closed container. The buffer tank 3 is filled with the treated liquid L2 when the treated liquid L2 is fed to the buffer tank 3. Even in the absence of a pump or the like downstream of the buffer tank 3, the treated liquid L2 is discharged from the buffer tank 3 when the treated liquid L2 discharged from the gas dissolving device 2 is fed to the buffer tank 3. There is no need to completely fill the buffer tank 3 with the treated liquid L2, and a region (space) empty of the treated liquid L2 may remain in the buffer tank 3.

The buffer tank 3 may be a container with any shape, but is preferably a cylindrical container. When the buffer tank 3 is a cylindrical container, the treated liquid L2 fed to the buffer tank 3 can undergo convection along the inner circumferential surface of the buffer tank 3. This configuration can ensure a sufficient convection time for the treated liquid L2 in the buffer tank 3 and can improve the stirring effect.

FIG. 3 illustrates an example arrangement of a feed port and a discharge port of the buffer tank. As illustrated in FIG. 1 and FIG. 3, the buffer tank 3 includes a feed port 3a, which is connected to the liquid feed pipe 13 of the gas dissolving device 2, and a discharge port 3b, which is connected to the treated-liquid discharge pipe 4. The arrangement of the feed port 3a and the discharge port 3b is not limited, but the feed port 3a and the discharge port 3b are preferably directed along lines different from each other as illustrated in FIGS. 3(a) and 3(b) in order to promote the convection and stirring of the treated liquid L2 in the buffer tank 3. When the feed port 3a and the discharge port 3b of the buffer tank 3 are directed along different lines, a large turbulent flow is generated in the buffer tank 3, and the pathway from the feed port 3a to the discharge port 3b becomes complicated. This configuration can promote the convection and stirring of the treated liquid L2.

The feed port 3a and the discharge port 3b of the buffer tank 3 illustrated in FIG. 3(a) are directed toward positions off a central axis C extending in the vertical direction of the buffer tank 3. When the feed port 3a and the discharge port 3b of the buffer tank 3 are directed toward positions off the central axis C of the buffer tank 3, the treated liquid L2 can be swirled in the buffer tank 3 around the central axis C of the buffer tank 3. This configuration can ensure a sufficient convection time for the treated liquid L2 in the buffer tank 3 and can improve the stirring effect.

The feed port 3a and the discharge port 3b of the buffer tank 3 illustrated in FIG. 3(b) are disposed in different positions in the vertical direction of the buffer tank 3. When the feed port 3a and the discharge port 3b of the buffer tank 3 are disposed in different positions in the vertical direction, a sufficient convection time for the treated liquid L2 in the buffer tank 3 can be ensured.

The discharge port 3b of the buffer tank 3 illustrated in FIG. 3(b) is disposed higher than the feed port 3a. When the treated liquid L2 contains air bubbles, the air bubbles rise up from the feed port 3a in the buffer tank 3. When the discharge port 3b is disposed higher than the feed port 3a, the air bubbles contained in the treated liquid L2 can be readily discharged from the discharge port 3b.

By the way, the experiment carried out by the inventors of the present invention leads to the finding that it takes about 7 to 12 seconds to sufficiently perform the ionization of equation (2). The details of the experiment are described in the following Examples. The capacity of the buffer tank 3 is preferably such that the buffer tank 3 is filled with the treated liquid L2 in 7 to 12 seconds, that is, the buffer tank 3 has the capacity corresponding to the flow of the treated liquid L2 for 7 to 12 seconds. When the capacity of the buffer tank 3 is such that the buffer tank 3 is filled with the treated liquid L2 in 7 to 12 seconds, the buffer tank 3 can be prevented from increasing in size, and the treated liquid L2 can dissociate well in the buffer tank 3.

As illustrated in FIG. 1, the treated-liquid discharge pipe 4 is a tubular member having a flow path on its inner circumferential side. The treated-liquid discharge pipe 4 is connected to the discharge port 3*b* of the buffer tank 3, and the treated liquid L2 is discharged from the buffer tank 3 through the treated-liquid discharge pipe 4. The treated liquid L2 flows through the treated-liquid discharge pipe 4 and is fed to a use point at which the treated liquid L2 is used. The materials, properties (e.g., hardness and elasticity), shape, size, and the like of the treated-liquid discharge pipe 4 are not limited.

As described above, in this embodiment, the gas dissolving device 2 generates the treated liquid L2 in which the regulating gas G is dissolved in the liquid L, and the generated treated liquid L2 is fed to the buffer tank 3. When the treated liquid L2 is fed to the buffer tank 3, the flow path of the treated liquid L2 widens rapidly, and the flow rate of the treated liquid L2 thus drops rapidly. This causes the treated liquid L2 fed to the buffer tank 3 to undergo convection in the buffer tank 3, which promotes dissociation of the treated liquid L2. The treated liquid L2 fed to the buffer tank 3 is stirred in the form of turbulent flow in the buffer tank 3, which promotes uniformization of ion concentration. As a result, the deviations and fluctuations in the resistivity of the treated liquid L2 are both reduced. In addition, the pressure drop of the treated liquid L2 can be reduced, and the apparatus scale can also be reduced, compared with the case of using a long pipe instead of a buffer tank.

The liquid L fed to the gas dissolving device 2 is divided into the liquid L that is fed to the hollow fiber membrane module 11 and the liquid L that bypasses the hollow fiber membrane module 11. In the hollow fiber membrane module 11, the regulating gas G that has passed through the hollow fiber membrane 21 is dissolved in the liquid L to generate the high-concentration-gas-added liquid L1 in which the regulating gas G is dissolved in the liquid L. Then, the high-concentration-gas-added liquid L1 generated in the hollow fiber membrane module 11 merges with the liquid L that has bypassed the hollow fiber membrane module 11 to generate the treated liquid L2. This configuration can stabilize the resistivity of the treated liquid L2 even if the flow rate of the liquid L fed to the gas dissolving device 2 fluctuates.

Second Embodiment

Next, a second embodiment will be described. The second embodiment is basically similar to the first embodiment and different from the first embodiment only in that the buffer tank is a container that is not filled up with the treated liquid and a pump is attached to the treated-liquid discharge pipe. The following description will be provided focusing only on points different from the first embodiment. The description of the same points as in the first embodiment will be omitted.

Figure 4:
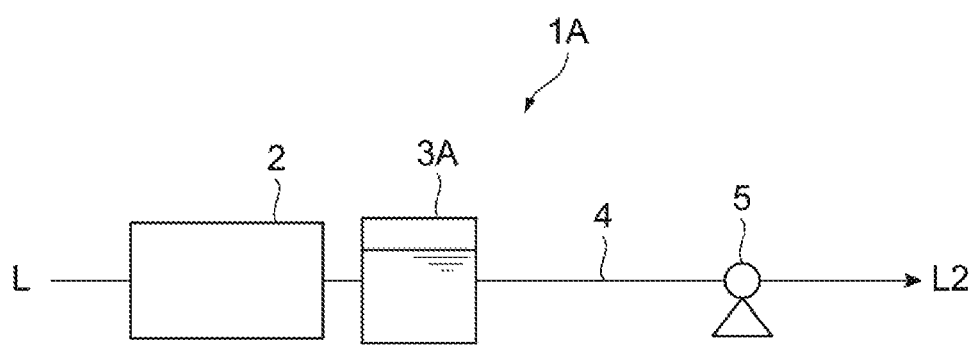
FIG. 4 is a schematic view of a resistivity regulating apparatus in a second embodiment.

FIG. 4 is a schematic view of a resistivity regulating apparatus in a second embodiment. As illustrated in FIG. 4, a resistivity regulating apparatus 1A in this embodiment includes a gas dissolving device 2, a buffer tank 3A, a treated-liquid discharge pipe 4, and a pump 5.

Like the buffer tank 3 in the first embodiment, the buffer tank 3A is a container that is fed with the treated liquid L2 discharged from the gas dissolving device 2 and can temporarily store the treated liquid L2.

The buffer tank 3A is an open container. The treated liquid L2 stored in the buffer tank 3A increases or decreases in volume when the treated liquid L2 is fed to the buffer tank 3A or the treated liquid L2 is discharged from the buffer tank 3A. Thus, the treated liquid L2 is not discharged from the buffer tank 3A only by feeding the treated liquid L2 discharged from the gas dissolving device 2 to the buffer tank 3A.

Figure 5:
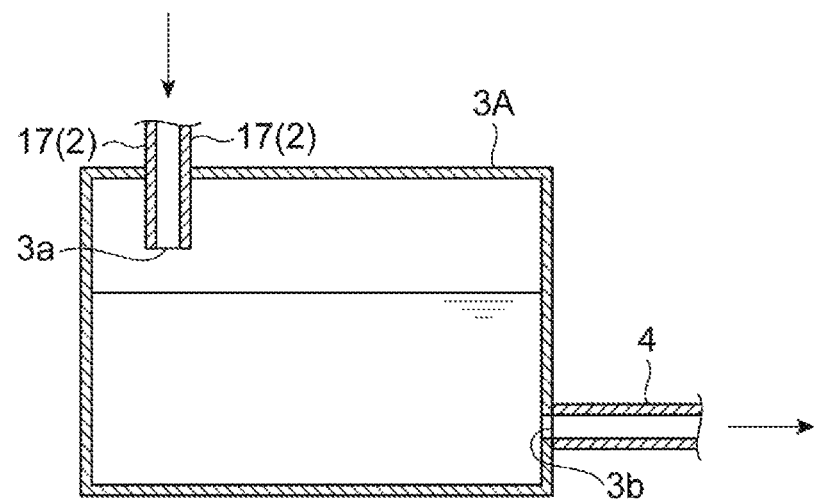
FIG. 5 illustrates an example arrangement of a feed port and a discharge port of a buffer tank.

FIG. 5 illustrates an example arrangement of a feed port and a discharge port of a buffer tank. As illustrated in FIG. 4 and FIG. 5, the buffer tank 3A includes a feed port 3*a*, which is connected to the liquid feed pipe 13 of the gas dissolving device 2, and a discharge port 3*b*, which is connected to the treated-liquid discharge pipe 4. The arrangement of the feed port 3*a* and the discharge port 3*b* is not limited, but the feed port 3*a* is preferably formed in an upper part of the buffer tank 3A as illustrated in FIG. 5 in order to promote the convection and stirring of the treated liquid L2 in the buffer tank 3A. The expression "the feed port 3*a* is formed in an upper part of the buffer tank 3A" means that, for example, the feed port 3*a* is formed on the ceiling wall of the buffer tank 3A; a liquid discharge pipe 17 penetrates the ceiling wall of the buffer tank 3A so that the feed port 3*a* is formed in an upper part of the buffer tank 3A; the feed port 3*a* is formed on an upper part of the side wall of the buffer tank 3A; a liquid discharge pipe 17 penetrates an upper part of the side wall of the buffer tank 3A so that the feed port 3*a* is formed in an upper part of the buffer tank 3A. When the feed port 3*a* is formed in an upper part of the buffer tank 3A, the treated liquid L2 stored in the buffer tank 3A can be stirred by the treated liquid L2 fed to the buffer tank 3A from the feed port 3*a*.

As illustrated in FIG. 4, the pump 5 is attached to the treated-liquid discharge pipe 4. The pump 5 delivers the treated liquid L2 in the treated-liquid discharge pipe 4 to the opposite side of the pump 5 from the buffer tank 3A, so that the treated liquid L2 is delivered from the buffer tank 3A to the treated-liquid discharge pipe 4.

Since, in this embodiment, the treated liquid L2 is fed to the buffer tank 3A as in the first embodiment, the deviations and fluctuations in the resistivity of the treated liquid L2 can be both reduced. In addition, the pressure drop of the treated liquid L2 can be reduced, and the apparatus scale can also be reduced, compared with the case of using a long pipe instead of a buffer tank.

Third Embodiment

Next, a third embodiment will be described below. The third embodiment is basically similar to the second embodiment and different from the second embodiment only in that the resistivity regulating apparatus further includes an on-off valve that opens and closes the treated-liquid discharge pipe, and a circulation pipe that returns the treated liquid flowing through the treated-liquid discharge pipe to the buffer tank. The following description will be provided focusing only on points different from the second embodiment. The description of the same points as in the second embodiment will be omitted.

Figure 6:
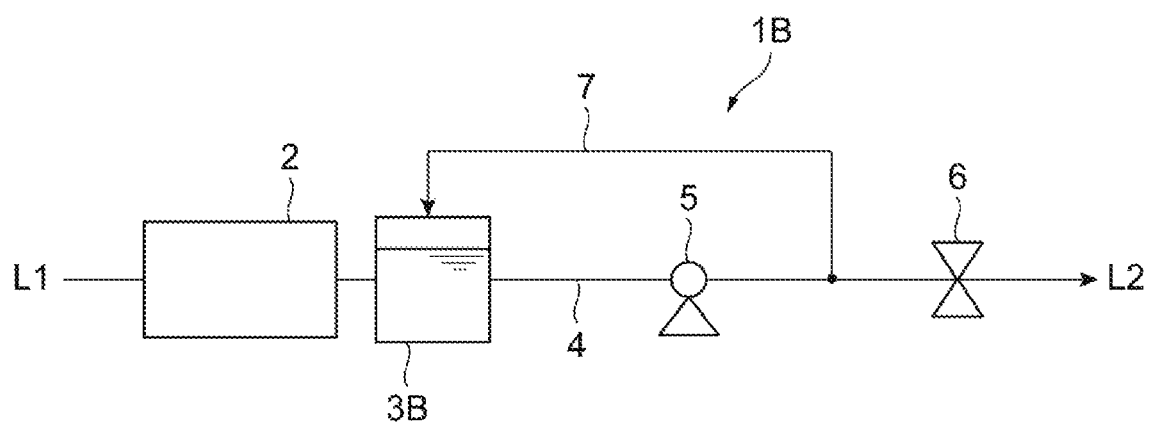
FIG. 6 is a schematic view of a resistivity regulating apparatus in a third embodiment.

FIG. 6 is a schematic view of a resistivity regulating apparatus in the third embodiment. As illustrated in FIG. 6, a resistivity regulating apparatus 1B in this embodiment includes a gas dissolving device 2, a buffer tank 3B, a treated-liquid discharge pipe 4, a pump 5, an on-off valve 6, and a circulation pipe 7.

The on-off valve 6 is attached to the treated-liquid discharge pipe 4 downstream of the pump 5 and opens and closes the treated-liquid discharge pipe 4. The on-off valve 6 can select whether the treated liquid L2 is fed to a use point by opening or closing the flow path of the treated-liquid discharge pipe 4.

The circulation pipe 7 is a tubular member having a flow path on its inner circumferential side. The circulation pipe 7 diverges from the treated-liquid discharge pipe 4 between the pump 5 and the on-off valve 6 and returns the treated liquid L2 flowing through the treated-liquid discharge pipe 4 to the buffer tank 3B. The "between the pump 5 and the on-off valve 6" means the downstream side of the pump 5 and the upstream side of the on-off valve 6. When the on-off valve 6 is opened, the treated liquid L2 discharged from the buffer tank 3B to the treated-liquid discharge pipe 4 is fed to a use point. When the on-off valve 6 is closed, the treated liquid L2 discharged from the buffer tank 3B to the treated-liquid discharge pipe 4 is returned to the buffer tank 3B through the circulation pipe 7.

The buffer tank 3B is an open container like the buffer tank 3A in the second embodiment. The treated liquid L2 stored in the buffer tank 3B increases or decreases in volume when the treated liquid L2 is fed to the buffer tank 3B or the treated liquid L2 is discharged from the buffer tank 3B. Thus, the treated liquid L2 is not discharged from the buffer tank 3B only by feeding the treated liquid L2 discharged from the gas dissolving device 2 to the buffer tank 3B.

Figure 7:
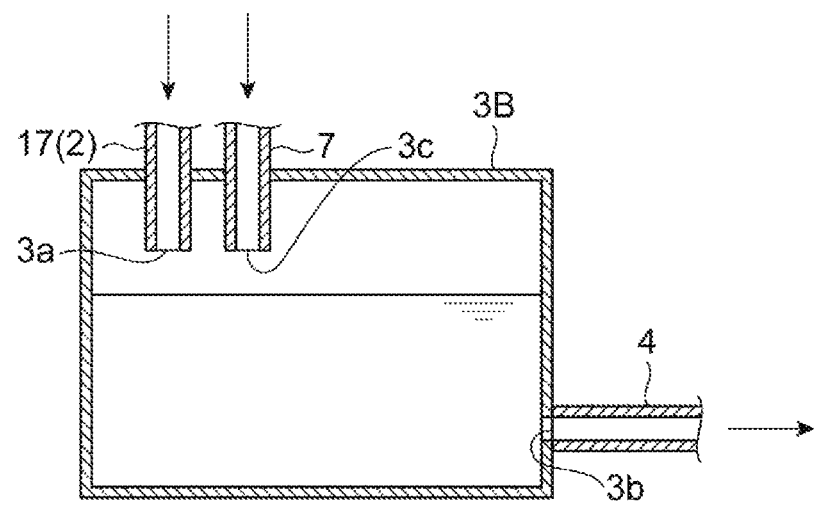
FIG. 7 illustrates an example arrangement of a feed port and a discharge port of a buffer tank.

FIG. 7 illustrates an example arrangement of a feed port and a discharge port of a buffer tank. As illustrated in FIG. 6 and FIG. 7, the buffer tank 3B includes a feed port 3a, which is connected to the liquid feed pipe 13 of the gas dissolving device 2, a discharge port 3b, which is connected to the treated-liquid discharge pipe 4, and a circulation port 3c, which is connected to the circulation pipe 7. The arrangement of the feed port 3a, the discharge port 3b, and the circulation port 3c is not limited, but the feed port 3a and the circulation port 3c are preferably formed in an upper part of the buffer tank 3B as illustrated in FIG. 7 in order to promote the convection and stirring of the treated liquid L2 in the buffer tank 3B. When the feed port 3a and the circulation port 3c are formed in an upper part of the buffer tank 3B, the treated liquid L2 stored in the buffer tank 3B can be stirred by the treated liquid L2 fed to the buffer tank 3B from the feed port 3a or the treated liquid L2 returned to the buffer tank 3B from the circulation port 3c.

As described above, in this embodiment, the treated liquid L2 can be fed to a use point from the treated-liquid discharge pipe 4 when the on-off valve 6 is opened, and the treated liquid L2 discharged from the buffer tank 3B to the treated-liquid discharge pipe 4 can be returned to the buffer tank 35 from the circulation pipe 7 when the on-off valve 6 is closed. When the treated liquid L2 is not needed at a use point, the treated liquid L2 can be circulated between the buffer tank 3B, the treated-liquid discharge pipe 4, and the circulation pipe 7 by closing the on-off valve 6. This configuration further promotes the dissociation of the treated liquid L2 and the uniformization of ion concentration and, therefore, further reduces the deviations and fluctuations in the resistivity of the treated liquid L2.

By the way, a cleaning machine for cleaning a substrate or other machine frequently causes flow rate fluctuations and thus gives rise to problems associated with fluctuations in resistivity caused by flow changes. If the flow rate is changed, it takes some time to stabilize the resistivity of the treated liquid L2. Since the treated liquid L2 stored in the buffer tank 3B is fed to a use point in this embodiment, it is not necessary to always generate the treated liquid L2 in the gas dissolving device 2, and it is necessary to generate the treated liquid L2 in the gas dissolving device 2 only when the treated liquid L2 stored in the buffer tank 3B runs short. The liquid L can thus be fed to the gas dissolving device 2 at a constant flow rate. Therefore, the resistivity of the treated liquid L2 can be stabilized without being affected by the flow rate fluctuations and the amount of the treated liquid L2 used at a use point.

Fourth Embodiment

Next, a fourth embodiment will be described below. The fourth embodiment is basically similar to the third embodiment and different from the third embodiment in that the resistivity of the treated liquid is regulated in the buffer tank. The following description will be provided focusing only on points different from the third embodiment. The description of the same points as in the third embodiment will be omitted.

Figure 8:
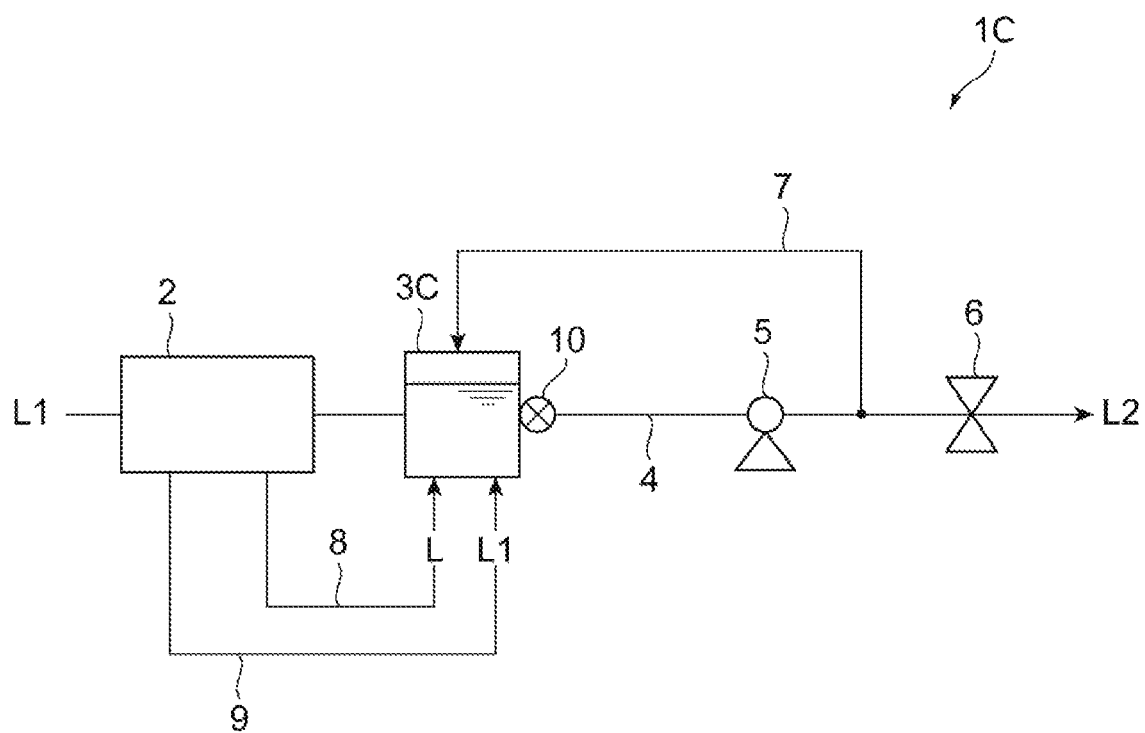
FIG. 8 is a schematic view of a resistivity regulating apparatus in a fourth embodiment.

FIG. 8 is a schematic view of a resistivity regulating apparatus in the fourth embodiment. As illustrated in FIG. 8, a resistivity regulating apparatus 1C in this embodiment includes a gas dissolving device 2, a buffer tank 3C, a treated-liquid discharge pipe 4, a pump 5, an on-off valve 6, a circulation pipe 7, a first regulation pipe 8, a second regulation pipe 9, and a resistivity sensor 10.

The first regulation pipe 8 is a tubular member having a flow path on its inner circumferential side. The liquid L is fed to the buffer tank 3C through the first regulation pipe 8. The first regulation pipe 8 is connected to the flow path of the liquid L. Examples of the flow path of the liquid L to which the first regulation pipe 8 is connected include the liquid feed pipe 13 of the gas dissolving device 2 and the bypass pipe 16. A solenoid valve (not shown) is attached to the first regulation pipe 8. A controller (not shown) that controls the resistivity regulating apparatus 1C controls the opening and closing of the solenoid valve on the basis of the result of the measurement with the resistivity sensor 10.

The second regulation pipe 9 is a tubular member having a flow path on its inner circumferential side. The high-concentration-gas-added liquid L1 is fed to the buffer tank 3C through the second regulation pipe 9. The second regulation pipe 9 is connected to the flow path of the high-concentration-gas-added liquid L1. Examples of the flow path of the high-concentration-gas-added liquid L1 to which the second regulation pipe 9 is connected include the module discharge pipe 15 of the gas dissolving device 2. A solenoid valve (not shown) is attached to the second regulation pipe 9. The controller (not shown) that controls the resistivity regulating apparatus 1C controls the opening and closing of the solenoid valve on the basis of the result of the measurement with the resistivity sensor 10.

The resistivity sensor 10 measures the resistivity of the treated liquid L2 stored in the buffer tank 3C. The treated liquid L2 stored in the buffer tank 3C has stable resistivity, but the resistivity may deviate from the resistivity regulated value due to device failures or the like. Thus, the resistivity of the treated liquid L2 stored in the buffer tank 3C is measured with the resistivity sensor 10. The controller (not shown) that controls the resistivity regulating apparatus 10 controls in such a manner that, when the result of the measurement deviates from the resistivity regulated value, the resistivity of the treated liquid L2 stored in the buffer tank 3C is regulated with the resistivity sensor 10 by feeding the liquid L or the high-concentration-gas-added liquid L1 to the buffer tank 3C from the first regulation pipe 8 or the second regulation pipe 9.

As described above, in this embodiment, the resistivity of the treated liquid L2 stored in the buffer tank 3C can be regulated by feeding the liquid L or the high-concentration-gas-added liquid L1 to the buffer tank 3C from the first regulation pipe 8 or the second regulation pipe 9 on the basis of the result of the measurement with the resistivity sensor 10. Even when the liquid L or the high-concentration-gas-added liquid L1 is fed to the buffer tank 3C, the dissociation and the uniformization of ion concentration of the treated liquid L2 stored in the buffer tank 3C can be promoted by closing the on-off valve 6 and circulating the treated liquid L2 between the buffer tank 3C, the treated-liquid discharge pipe 4, and the circulation pipe 7.

The embodiments of the present invention are described above, but the present invention is not limited to the foregoing embodiments. For example, the foregoing embodiments may be combined appropriately. In the foregoing embodiments, the gas dissolving device is a membrane-type gas dissolving device in which the high-concentration-gas-added liquid L1 generated in the hollow fiber membrane module merges with the liquid L that has bypassed the hollow fiber membrane module to generate the treated liquid L2. However, the gas dissolving device may be, for example, any of the gas injection-type gas dissolving devices as described in, for example, Japanese Unexamined Patent Application Publication Nos. 60-027603, 10-212105, and 2004-344821.

EXAMPLES

Examples of the present invention will be described next, but the present invention is not limited to the following Examples.

Example 1

In Example 1, the resistivity regulating apparatus 1 in the first embodiment illustrated in FIG. 1 was used. The liquid L fed to the gas dissolving device 2 (liquid feed pipe 13) had the following parameters: temperature: 25 [° C.], feed pressure: 0.25 [MPa], resistivity: 18.2 [MΩ·cm], and flow rate: 2.0 [L/min]. The resistivity regulated value was 0.4 [MΩ·cm], 0.5 [MΩ·cm], 0.6 [MΩ·cm], 0.8 [MΩ·cm], and 1.0 [MΩ·cm]. The treated-liquid discharge pipe 4 was a tube 12 [mm] in diameter×8 [mm]. The buffer tank 3 was a cylindrical container. The capacity (internal capacity) of the buffer tank 3 was 400 [cc] in order that the presumed residence time of the treated liquid L2 in the buffer tank 3 became about 12 seconds. The presumed convection time was the time obtained by dividing the capacity of the buffer tank 3 by the flow rate of the treated liquid L2.

Figure 10:
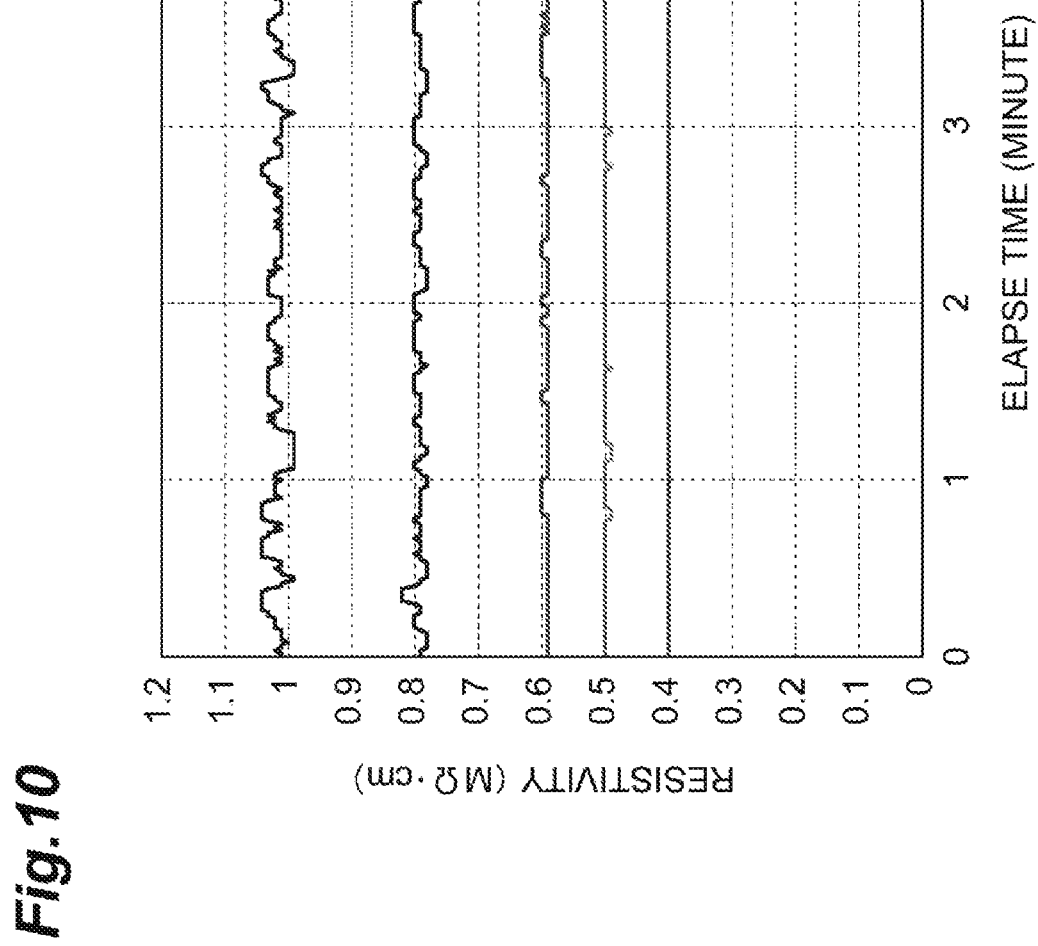
FIG. 10 shows the measurement results of Example 1.

A resistivity sensor was attached immediately after the buffer tank 3, and the resistivity of the treated liquid L2 was measured with the resistivity sensor. The resistivity sensor was HE-480R available from HORIBA Advanced Techno, Co., Ltd. The measurement results are shown in FIG. 10.

Comparative Example 1

Figure 9:
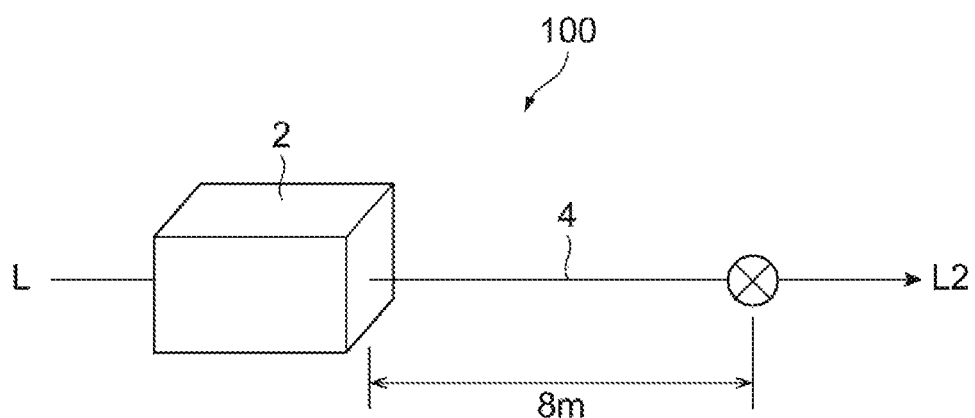
FIG. 9 is a schematic view of a resistivity regulating apparatus in Comparative Example.

In Comparative Example 1, a resistivity regulating apparatus 100 illustrated in FIG. 9 was used. The resistivity regulating apparatus 100 in Comparative Example 1 was the same as the resistivity regulating apparatus 1 in Example 1 except for the absence of the buffer tank. The liquid L fed to the gas dissolving device 2 (liquid feed pipe 13) and the resistivity regulated value were set to the same conditions as in Example 1.

A resistivity sensor was attached to the treated-liquid discharge pipe 4 at 8m downstream of the gas dissolving device 2 in order that the time until the treated liquid L2 discharged from the gas dissolving device 2 reached the resistivity sensor became the same condition as in Example 1. The resistivity of the treated liquid L2 was measured with the resistivity sensor. Specifically, when the resistivity sensor was attached at the above-described position, the presumed time until the treated liquid L2 reached the resistivity sensor after discharged from the gas dissolving device 2 was about 12 seconds, and the capacity (internal capacity) of the treated-liquid discharge pipe 4 up to the resistivity sensor was 400 cc. The resistivity sensor was the same as in Example 1. The measurement results are shown in FIG. 11.

[Evaluation 1]

Figure 11:
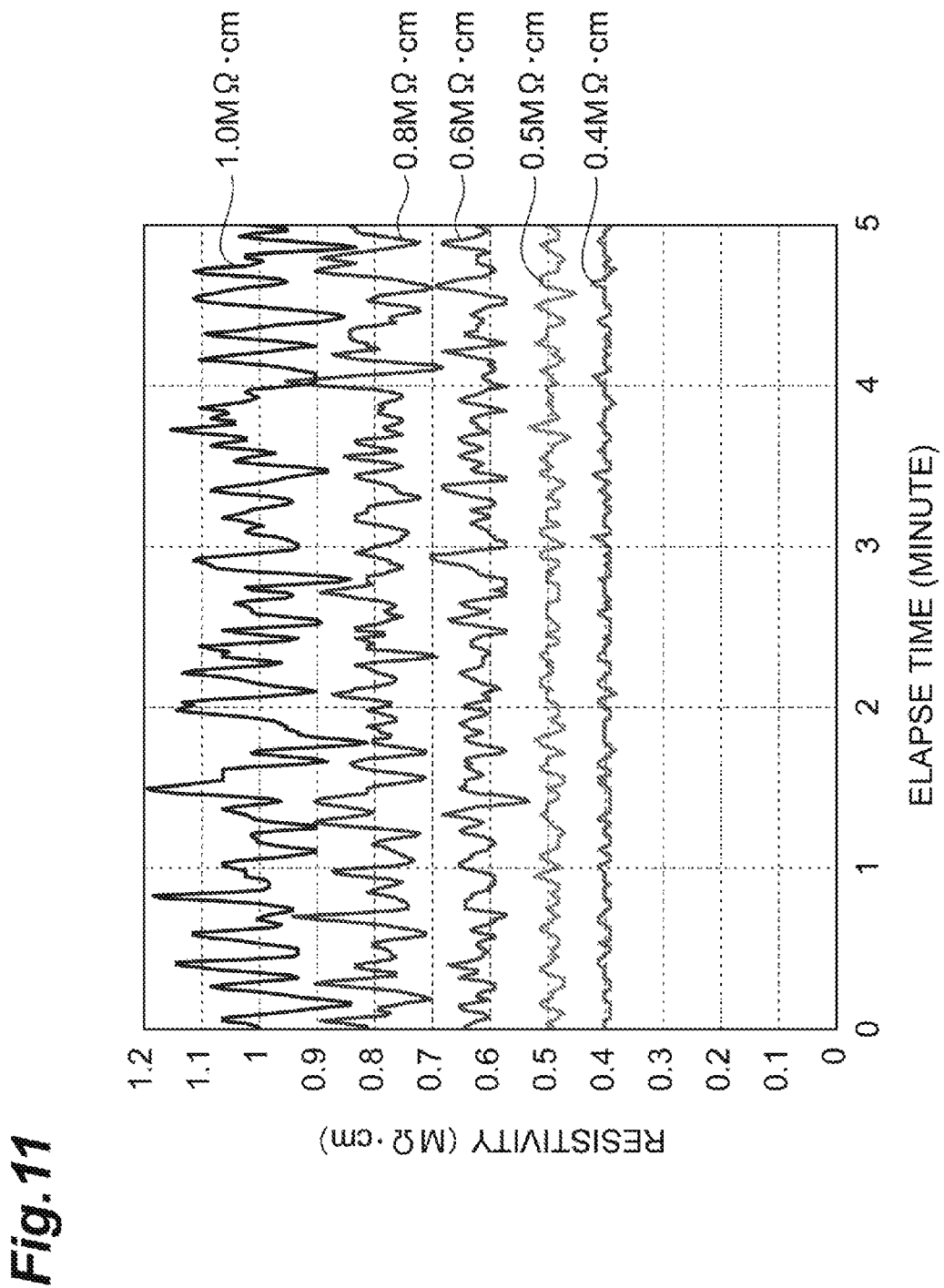
FIG. 11 shows the measurement results of Comparative Example 1.

As illustrated in FIG. 11, the distance to the resistivity sensor was long in Comparative Example 1, and the resistivity fluctuations due to uneven ion concentration were thus large.

As illustrated in FIG. 10, the resistivity fluctuations in Example 1 were much smaller than those in Comparative Example 1. These results indicate that the resistivity fluctuations can be reduced by providing the buffer tank 3.

Example 2

In Example 2, the resistivity regulating apparatus 1 in the first embodiment illustrated in FIG. 1 was used. The liquid L fed to the gas dissolving device 2 (liquid feed pipe 13) had the following parameters: temperature: 25 [° C.], feed pressure: 0.25 [MPa], and resistivity: 18.2 [MΩ·cm]. The flow rate of the liquid L was 2.0 [L/min], 1.0 [L/min], and 0.2 [L/min]. The resistivity regulated value was 0.2 [MΩ·cm], 0.5 [Ω·cm], 0.6 [MΩ·cm], 0.7 [MΩ·cm], 0.8 [MΩ·cm], 0.9 [MΩ·cm], and 1.0 [MΩ·cm]. The buffer tank 3 was a cylindrical container, and the capacity (internal capacity) of the buffer tank 3 was 700 [cc]. The feed port 3a and the discharge port 3b of the buffer tank 3 were directed along the same line.

Figure 12:
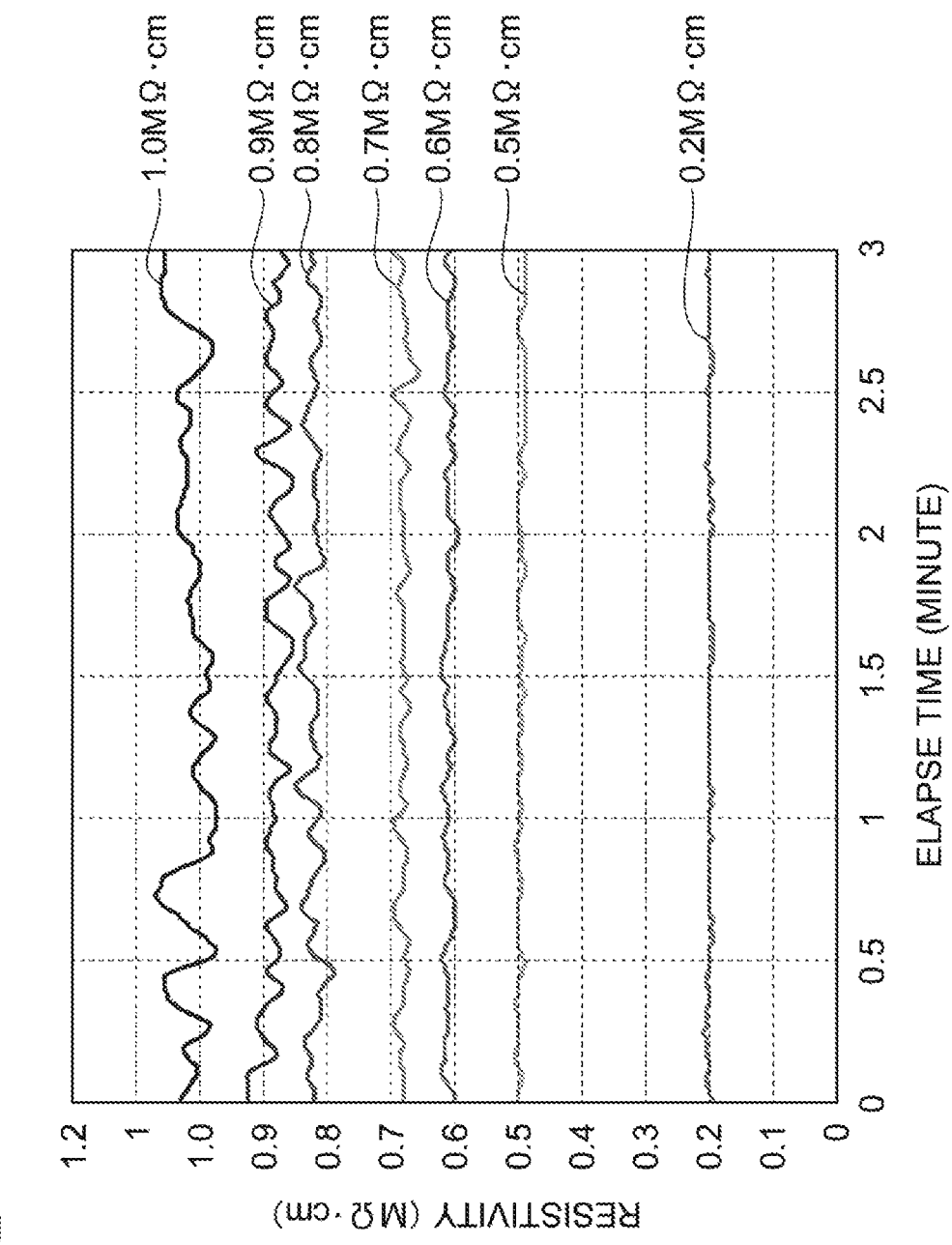
FIG. 12 shows the measurement results in the case where the flow rate in Example 2 is 2.0 [L/min].
Figure 13:
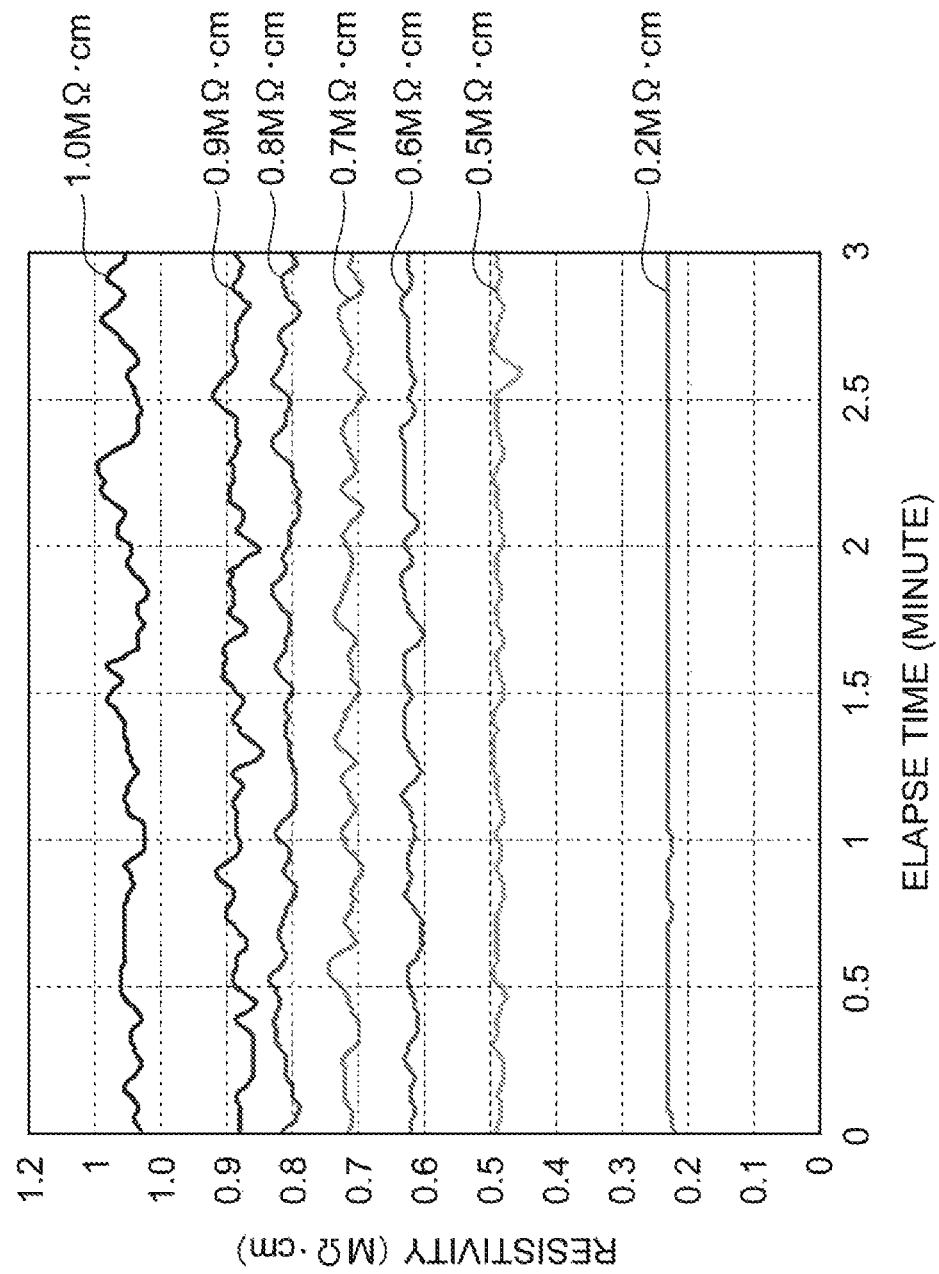
FIG. 13 shows the measurement results in the case where the flow rate in Example 2 is 1.0 [L/min].
Figure 14:
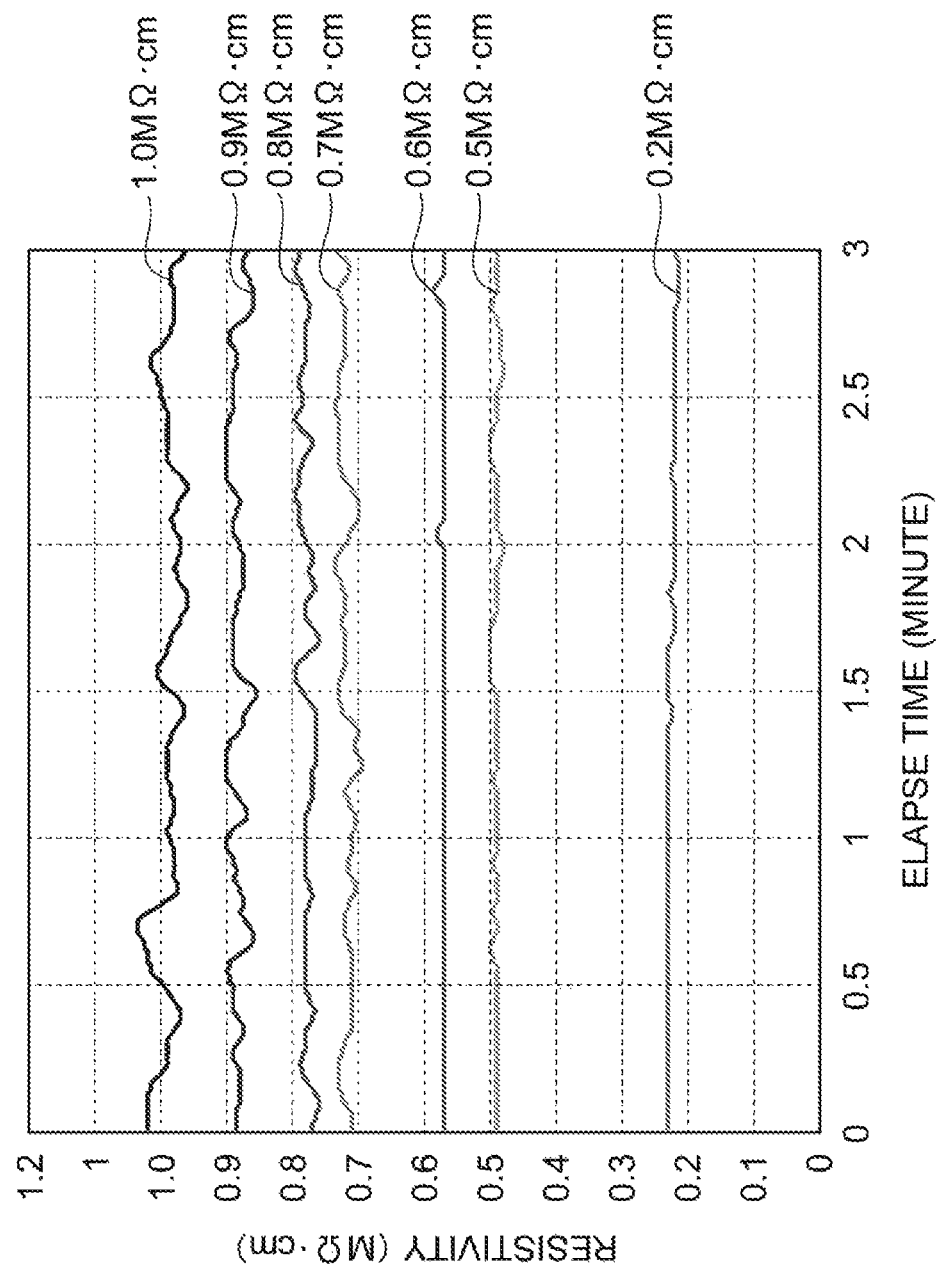
FIG. 14 shows the measurement results in the case where the flow rate in Example 2 is 0.2 [L/min].

A resistivity sensor was attached immediately after the buffer tank 3, and the resistivity of the treated liquid L2 was measured with the resistivity sensor. The resistivity sensor was the same as in Example 1. The measurement results at a flow rate of 2.0 [L/min] are shown in FIG. 12, the measurement results at a flow rate of 1.0 [L/min] are shown in FIG. 13, and the measurement results at a flow rate of 0.2 [L/min] are shown in FIG. 14.

Example 3

In Example 3, the conditions were the same as in Example 2 except that the feed port 3a and the discharge port 3b of the buffer tank 3 were directed along lines different from each other. Specifically, the feed port 3a and the discharge port 3b were directed toward positions off the central axis extending in the vertical direction of the buffer tank 3. Furthermore, the discharge port 3b was disposed higher than the feed port 3a.

A resistivity sensor was attached immediately after the buffer tank 3, and the resistivity of the treated liquid L2 was measured with the resistivity sensor. The resistivity sensor was the same as in Example 1. The measurement results at a flow rate of 2.0 [L/min] are shown in FIG. 15, the measurement results at a flow rate of 1.0 [L/min] are shown in FIG. 16, and the measurement results at a flow rate of 0.2 [L/min] are shown in FIG. 17.

[Evaluation 2]

Figure 15:
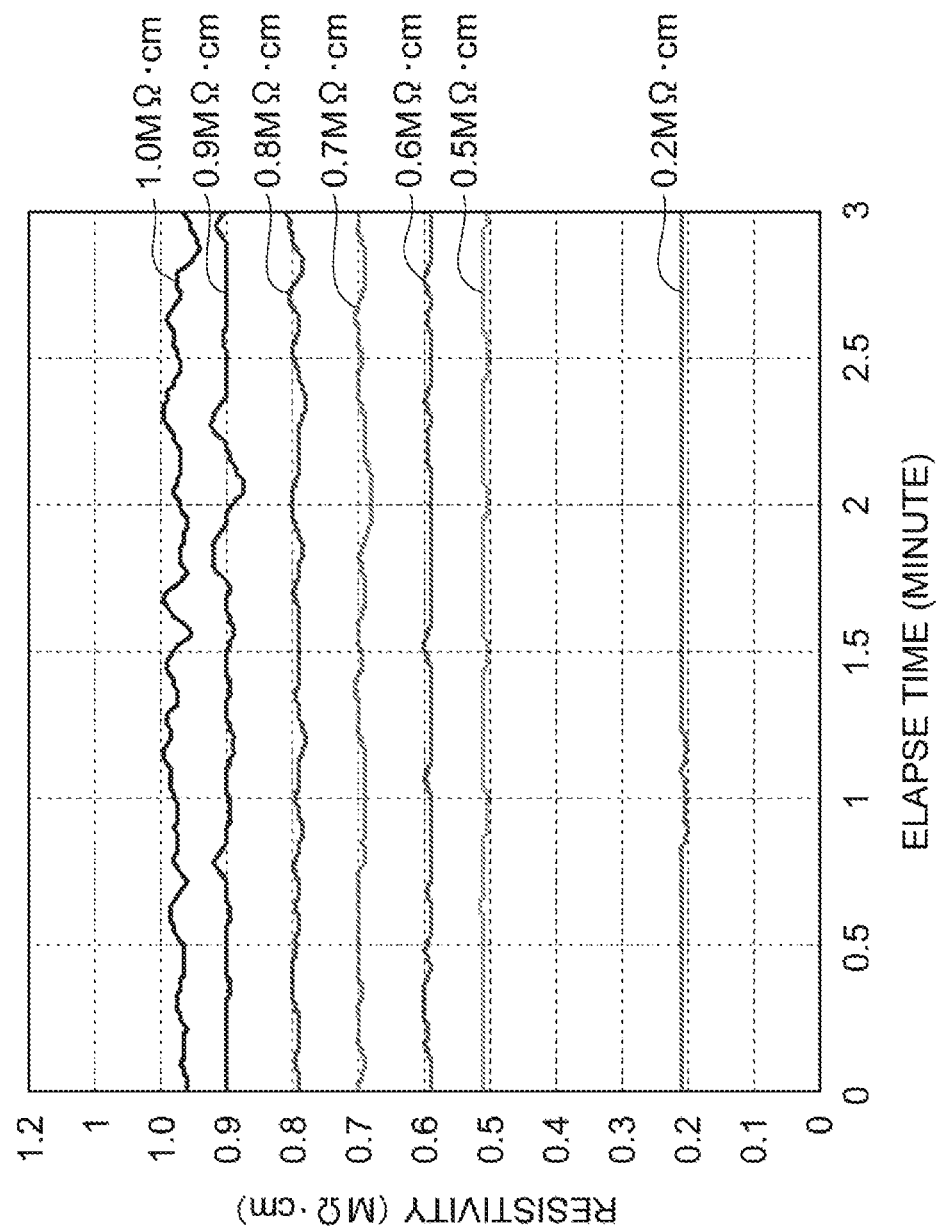
FIG. 15 shows the measurement results in the case where the flow rate in Example 3 is 2.0 [L/min].
Figure 16:
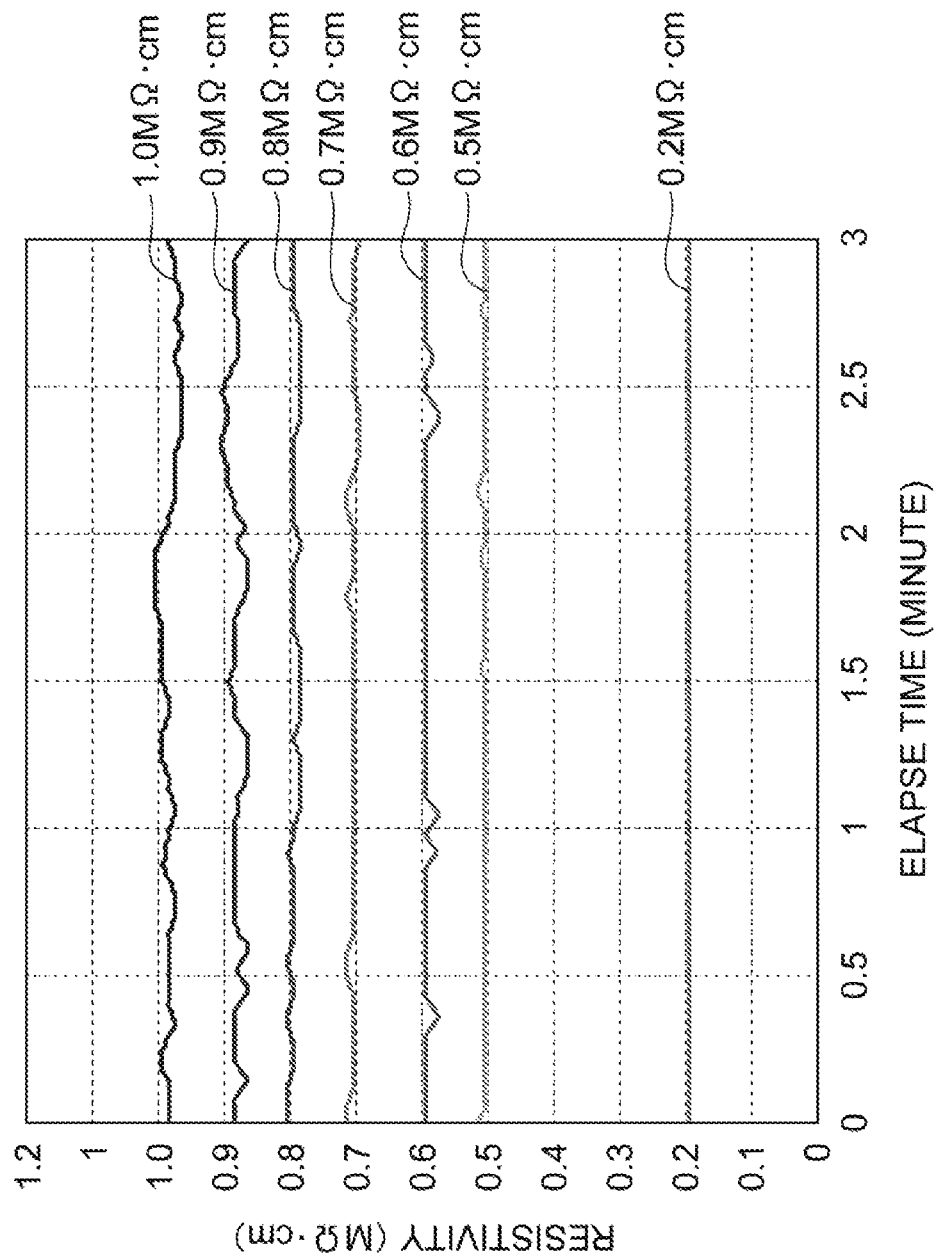
FIG. 16 shows the measurement results in the case where the flow rate in Example 3 is 1.0 [L/min].
Figure 17:
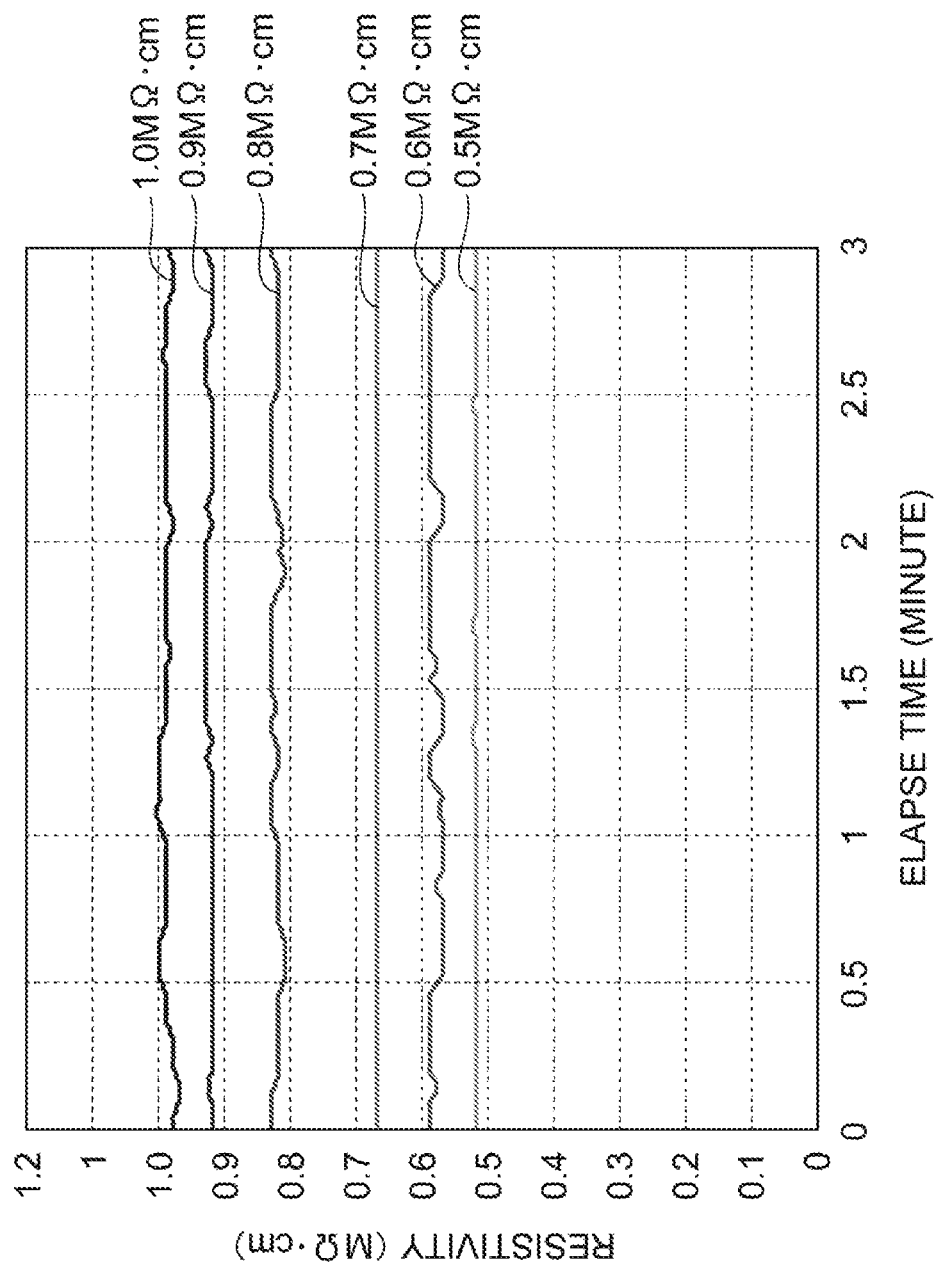
FIG. 17 shows the measurement results in the case where the flow rate in Example 3 is 0.2 [L/min].

As FIG. 12 to FIG. 14 are compared with FIG. 15 to FIG. 17, the resistivity fluctuations in Example 3 are smaller than those in Example 2 regardless of the flow rate of the liquid L. This may be because the treated liquid L2 tends to linearly pass through from the feed port 3a to the discharge port 3b of the buffer tank 3 in Example 2, which results in a weaker effect of stirring the treated liquid L2 in Example 2 than that in Example 3. In Example 3, the treated liquid L2 strikes the inner surface of the buffer tank 3 and undergoes convection so as to swirl, which results in a higher stirring effect than that in Example 2.

Example 4

In Example 4, the resistivity regulating apparatus 1 in the first embodiment illustrated in FIG. 1 was used. The liquid L fed to the gas dissolving device 2 (liquid feed pipe 13) had the following parameters: temperature: 25 [° C.], feed pressure: 0.25 [MPa], resistivity: 18.2 [MΩ·cm], and flow rate: 2.0 [L/min]. The resistivity regulated value was 0.1 [MΩ·cm], 0.2 [MΩ·cm], 0.5 [MΩ·cm], 0.6 [MΩ·cm], 0.7 [MΩ·cm], 0.8 [MΩ·cm], 0.9 [MΩ·cm], and 1.0 [MΩ·cm]. The buffer tank 3 was a cylindrical container, and the capacity (internal capacity) of the buffer tank 3 was 150 [cc], 300 [cc], 400 [cc], 500 [cc], and 700 [cc].

Figure 18:
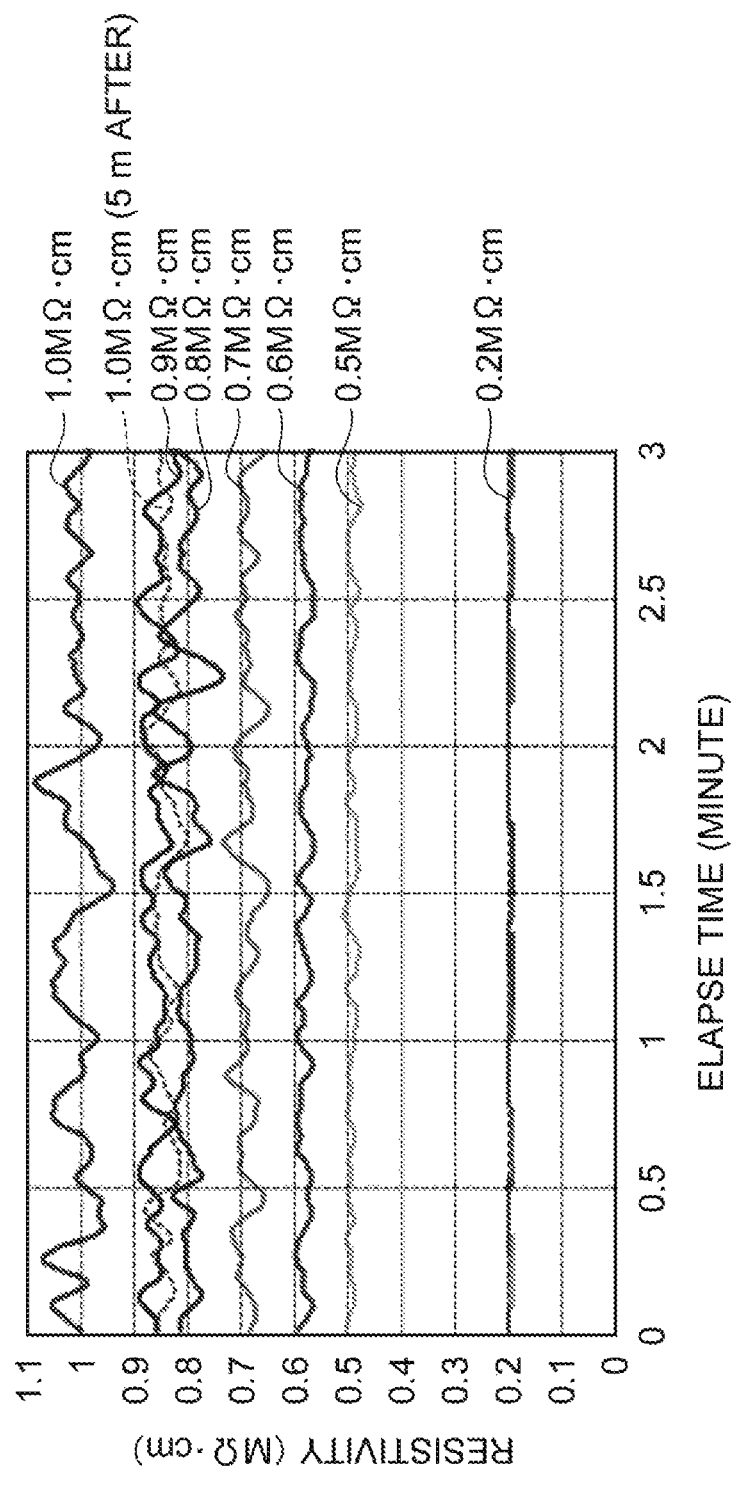
FIG. 18 shows the measurement results in the case where the capacity of the buffer tank in Example 4 is 150 [cc].
Figure 19:
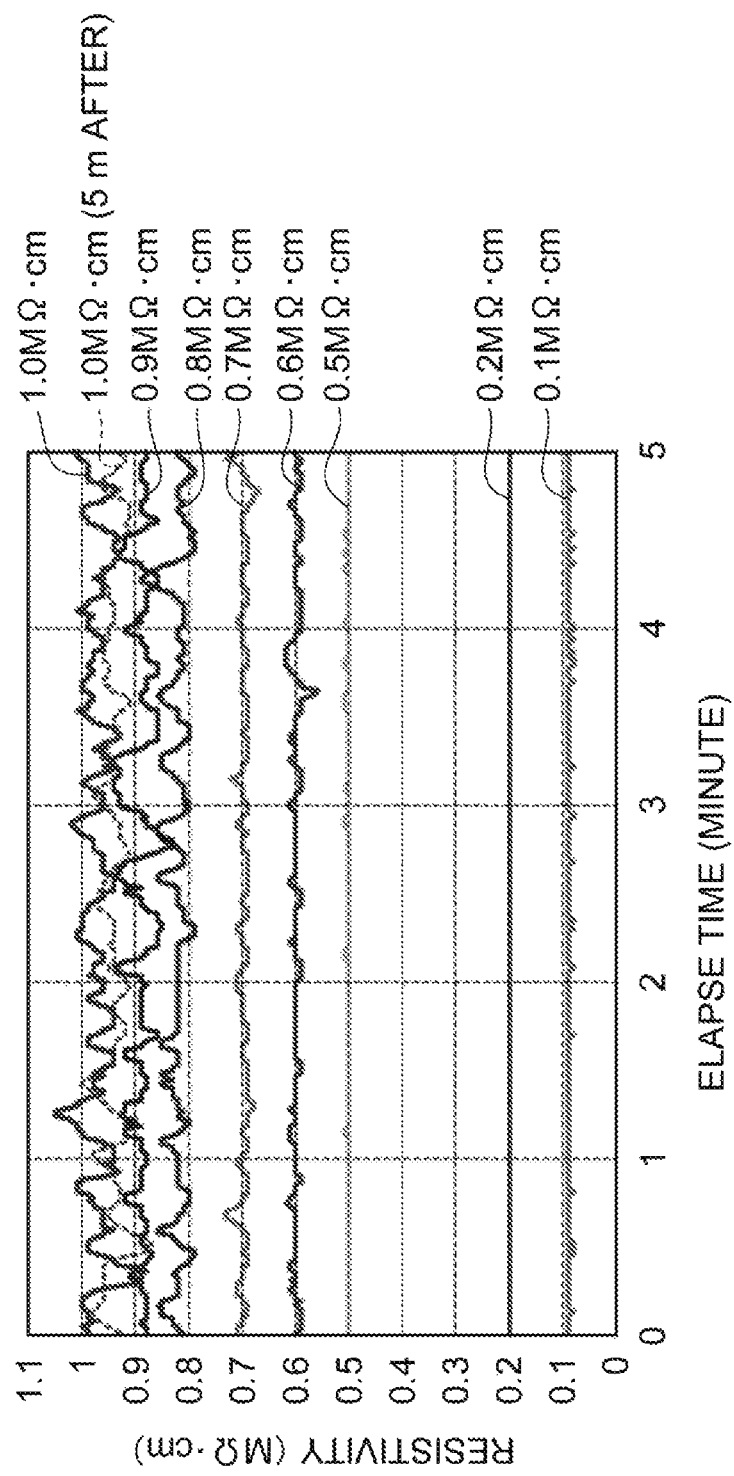
FIG. 19 shows the measurement results in the case where the capacity of the buffer tank in Example 4 is 300 [cc].
Figure 20:
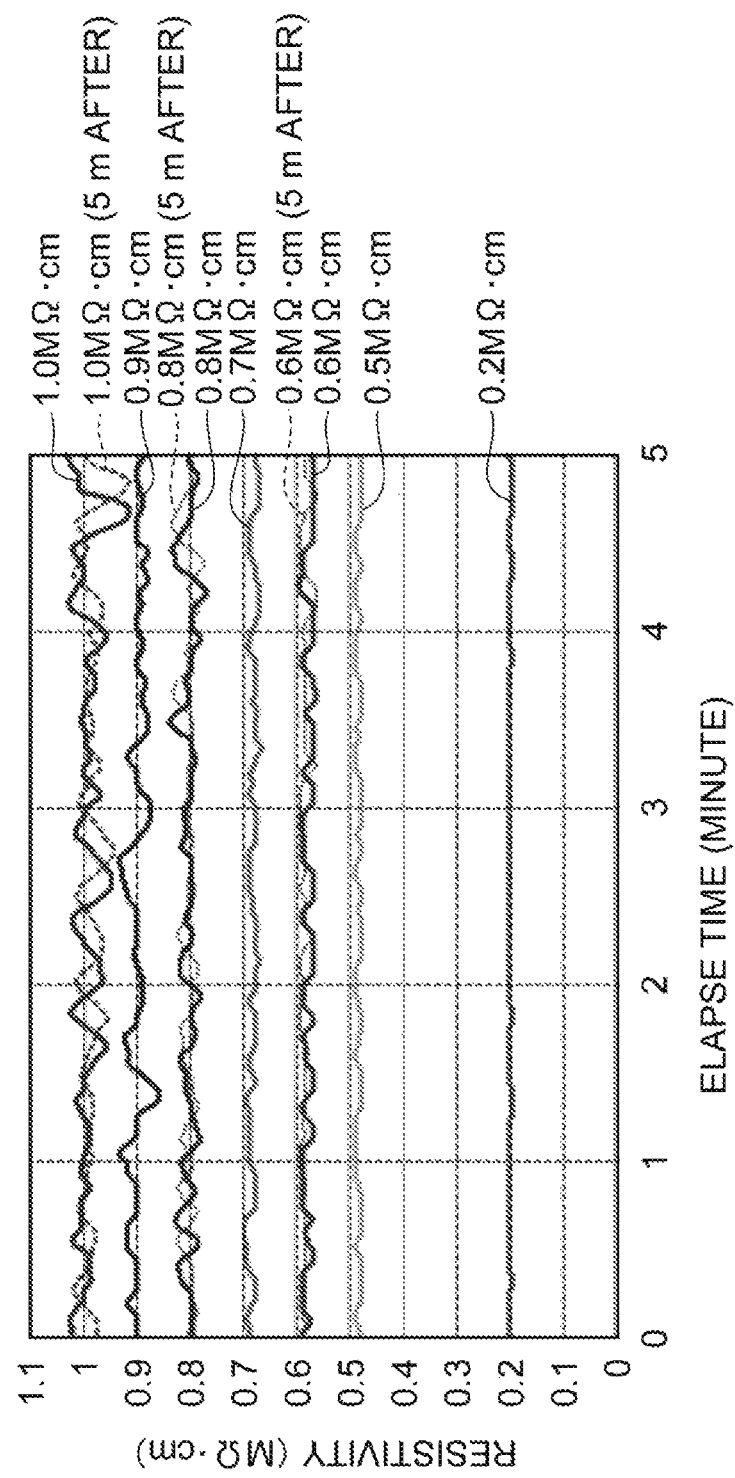
FIG. 20 shows the measurement results in the case where the capacity of the buffer tank in Example 4 is 400 [cc].
Figure 21:
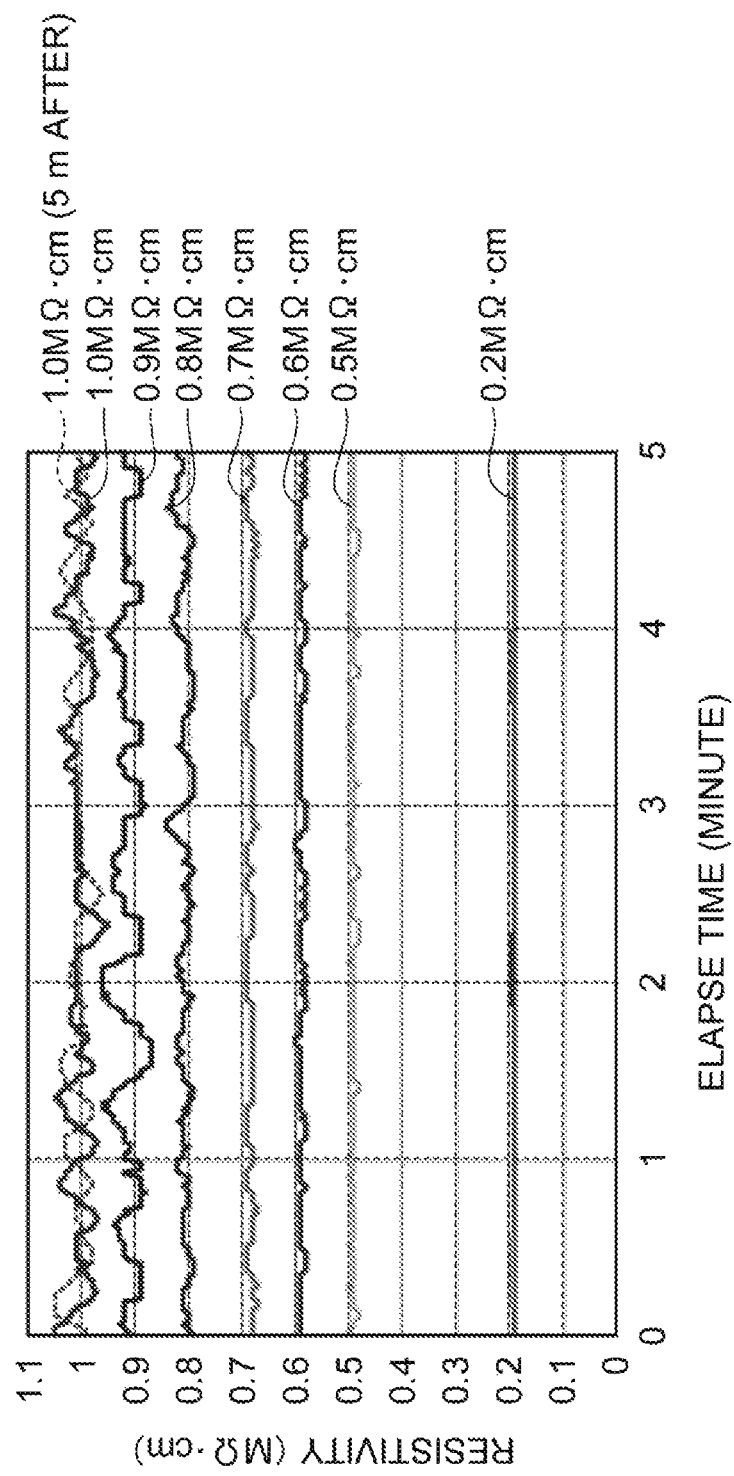
FIG. 21 shows the measurement results in the case where the capacity of the buffer tank in Example 4 is 500 [cc].
Figure 22:
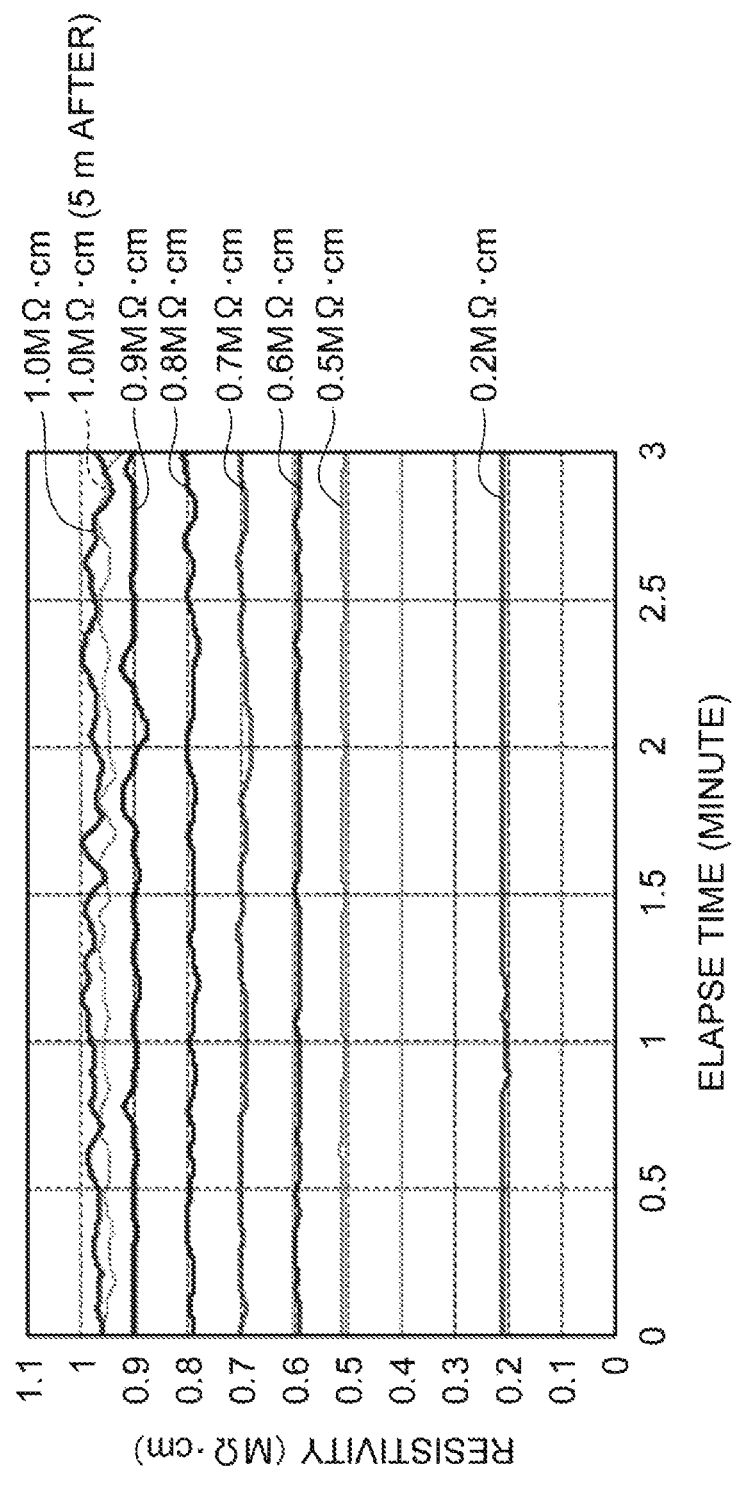
FIG. 22 shows the measurement results in the case where the capacity of the buffer tank in Example 4 is 700 [cc].

Resistivity sensors were attached immediately after the buffer tank 3 and to the treated-liquid discharge pipe 4 at 5 m downstream of the buffer tank 3, and the resistivity of the treated liquid L2 was measured with the resistivity sensors. The resistivity sensors were the same as in Example 1. The measurement results at a capacity of the buffer tank 3 of 150 [cc] are shown in FIG. 18, the measurement results at a capacity of the buffer tank 3 of 300 [cc] are shown in FIG. 19, the measurement results at a capacity of the buffer tank 3 of 400 [cc] are shown in FIG. 20, the measurement results at a capacity of the buffer tank 3 of 500 [cc] are shown in FIG. 21, and the measurement results at a capacity of the buffer tank 3 of 700 [cc] are shown in FIG. 22.
[Evaluation 3]

As the results of the measurement with the resistivity sensor attached immediately after the buffer tank 3 are compared, the fluctuation range of the resistivity becomes smaller with increasing capacity of the buffer tank 3. The results indicate that the stirring of the treated liquid L2 in the buffer tank 3 is promoted as the capacity of the buffer tank 3 increases, which makes the ion concentration uniform and reduces the resistivity fluctuations.
[Evaluation 4]

As the results of the measurement with the resistivity sensor attached immediately after the buffer tank 3 are compared with the results of the measurement with the resistivity sensor attached to the treated-liquid discharge pipe 4 at 5 m downstream of the buffer tank 3, the differences in resistivity become smaller with increasing capacity of the buffer tank 3. The results indicate that, since the residence time of the treated liquid L2 in the buffer tank 3 becomes longer as the capacity of the buffer tank 3 increases, the uniformization of ion concentration and the dissociation are promoted, and the fluctuations and deviations in resistivity are both reduced.
[Evaluation 5]

As the results of the measurement with the resistivity sensor attached immediately after the buffer tank 3 are compared with the results of the measurement with the resistivity sensor attached to the treated-liquid discharge pipe 4 at 5 m downstream of the buffer tank 3, the differences in resistivity were small when the capacity of the buffer tank 3 was larger than 150 [cc]. When the capacity of the buffer tank 3 was 400 [cc] or larger, the differences in resistivity were almost unchanged. The presumed residence time of the treated liquid L2 in the buffer tank 3 in the case where the capacity of the buffer tank 3 is 150 [cc] is about 5 seconds. The presumed residence time of the treated liquid L2 in the buffer tank 3 in the case where the capacity of the buffer tank 3 is 300 [cc] is about 9 seconds. The presumed residence time of the treated liquid L2 in the buffer tank 3 in the case where the capacity of the buffer tank 3 is 400 [cc] is about 12 seconds. It is thus found that, when the capacity of the buffer tank 3 is such that the buffer tank 3 is filled with the treated liquid L2 in about 7 to 12 seconds, that is, the buffer tank 3 has the capacity corresponding to the flow of the treated liquid L2 for about 7 to 12 seconds, the buffer tank 3 can be prevented from increasing in size, and the treated liquid L2 can dissociate well in the buffer tank 3.

Example 5

In Example 5, the conditions were the same as in Example 4 except that the flow rate of the liquid L was 1.0 [L/min] and 0.2 [L/min], and the capacity of the buffer tank 3 was 400 [cc].

Resistivity sensors were attached at the same positions as in Example 4, and the resistivity of the treated liquid L2 was measured with the resistivity sensors. The resistivity sensors were the same as in Example 1. The measurement results at a flow rate of the liquid L of 1.0 [L/min] are shown in FIG. 23, and the measurement results at a flow rate of the liquid L of 0.2 [L/min] are shown in FIG. 24.
[Evaluation]

Figure 23:
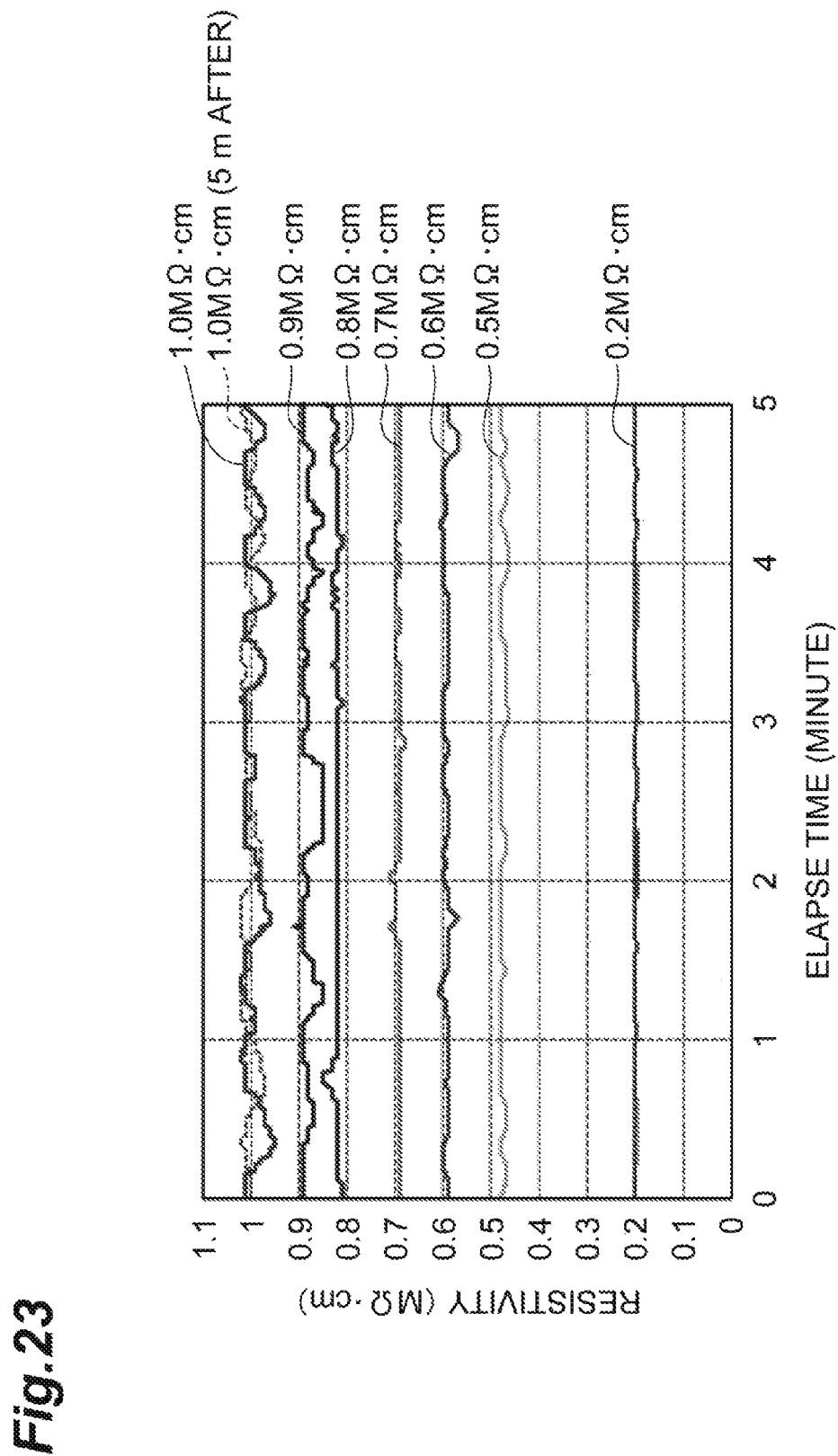
FIG. 23 shows the measurement results in the case where the flow rate of the liquid in Example 5 is 1.0 [L/min].
Figure 24:
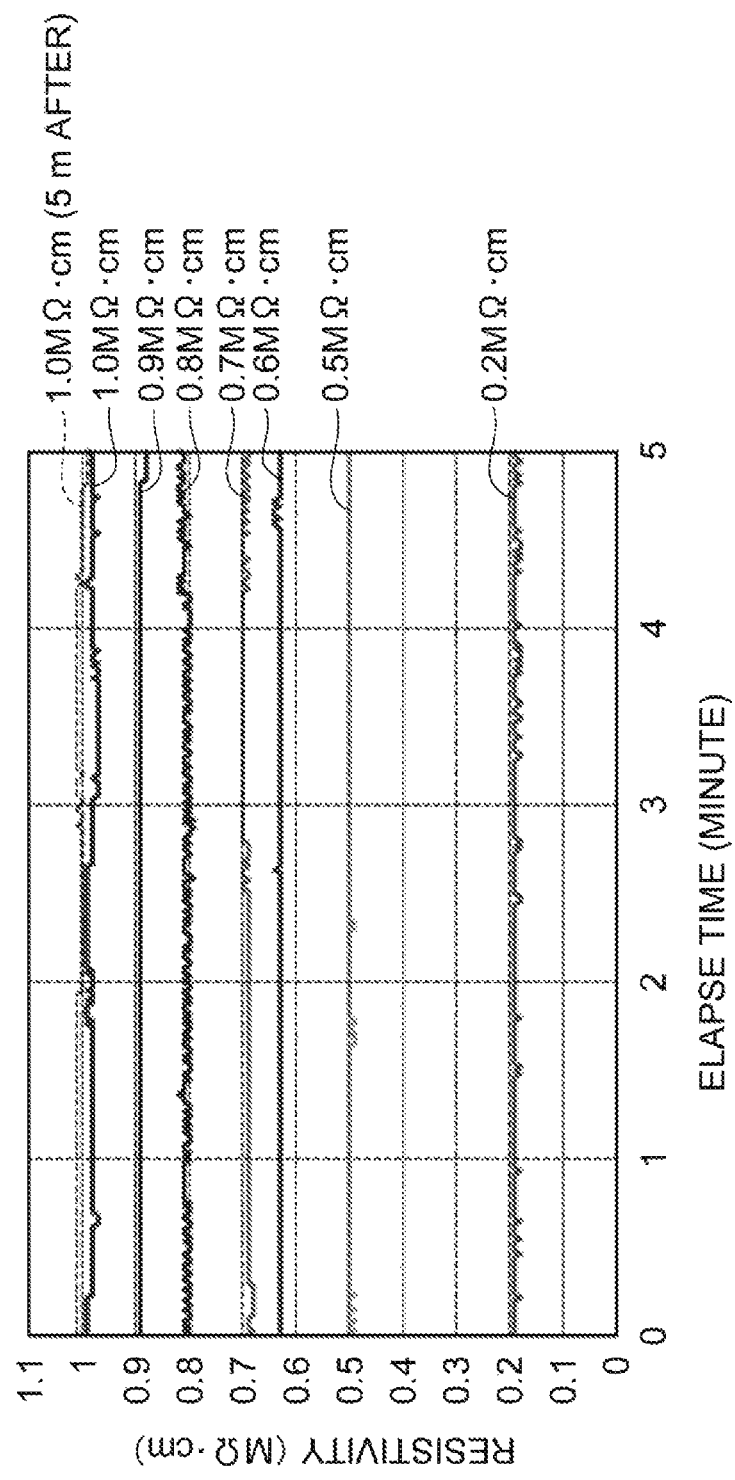
FIG. 24 shows the measurement results in the case where the flow rate of the liquid in Example 5 is 0.2 [L/min].

In FIG. 20, FIG. 23, and FIG. 24, only the flow rate of the liquid L is different, and the other conditions are the same. In any of the measurement results, the fluctuations and deviations in resistivity were both reduced. The results indicate that Evaluation 3 to Evaluation 5 are assumed to be appropriate regardless of the flow rate of the liquid L.

REFERENCE SIGNS LIST 1, 1A, 1B, 1C . . . Resistivity regulating apparatus, 2 . . . Gas dissolving device, 3, 3A, 3B, 3C . . . Buffer tank, 3a . . . Feed port, 3b . . . Discharge port, 3c • • • Circulation port, 4 . . . Treated-liquid discharge pipe, 5 . . . Pump, 6 • • • On-off valve, 7 . . . Circulation pipe, 8 . . . First regulation pipe, 9 . . . Second regulation pipe, 10 . . . Resistivity sensor, 11 . . . Hollow fiber membrane module, 12 . . . Gas feed pipe, 13 . . . Liquid feed pipe, 14 . . . Module feed pipe, 15 . . . Module discharge pipe, 16 . . . Bypass pipe, 17 . . . Liquid discharge pipe, 18 . . . Regulating valve, 19 . . . Pressure regulating valve, 21 . . . Hollow fiber membrane, 22 • • • Housing, 23 . . . Gas feed port, 24 . . . Liquid feed port, 25 . . . Liquid discharge port, 100 . . . Resistivity regulating apparatus, A . . . Diversion section, B . . . Merge section, C . . . Central axis, G . . . Regulating gas, L . . . Liquid, L1 • • • High-concentration-gas-added liquid, L2 . . . Treated liquid, P1 . . . Pressure gauge.

The invention claimed is:

1. A resistivity regulating apparatus comprising:
a gas dissolving device that causes a regulating gas to dissolve in an ultrapure water targeted for resistivity regulation to generate a treated liquid in which the regulating gas is dissolved in the ultrapure water, the regulating gas being used to regulate a resistivity of the ultrapure water; and
a buffer tank to which the treated liquid discharged from the gas dissolving device is fed,
wherein the gas dissolving device includes:
a hollow fiber membrane module in which a hollow fiber membrane separates a liquid phase-side region fed with the ultrapure water from a gas phase-side region fed with the regulating gas and in which the regulating gas having passed through the hollow fiber membrane is dissolved in the ultrapure water in a saturated state to generate a regulating gas-saturated liquid;

a liquid feed pipe through which the ultrapure water is fed;

a module feed pipe that communicates with the liquid feed pipe through a diversion section at which the module feed pipe diverges from the liquid feed pipe so as to feed the ultrapure water to the hollow fiber membrane module;

a module discharge pipe through which the regulating gas-saturated liquid is discharged from the hollow fiber membrane module;

a bypass pipe that communicates with the liquid feed pipe through the diversion section and bypasses the hollow fiber membrane module; and a liquid discharge pipe that communicates with the module discharge pipe and the bypass pipe through a merge section at which the module discharge pipe merges with the bypass pipe.

2. The resistivity regulating apparatus according to claim 1, wherein the buffer tank is a cylindrical container.

3. The resistivity regulating apparatus according to claim 1, wherein the buffer tank has a feed port for feeding the treated liquid and a discharge port for discharging the treated liquid, and the feed port and the discharge port are directed along lines different from each other.

4. The resistivity regulating apparatus according to claim 3, wherein the feed port and the discharge port are directed toward positions off a central axis extending in a vertical direction of the buffer tank.

5. The resistivity regulating apparatus according to claim 3, wherein the feed port and the discharge port are disposed in different positions in a vertical direction of the buffer tank.

6. The resistivity regulating apparatus according to claim 5, wherein the discharge port is disposed higher than the feed port.

7. The resistivity regulating apparatus according to claim 5, wherein the feed port is formed in an upper part of the buffer tank.

8. The resistivity regulating apparatus according to claim 1, wherein a capacity of the buffer tank is such that the buffer tank is filled with the treated liquid in 7 to 12 seconds.

9. The resistivity regulating apparatus according to claim 1, further comprising:

a treated-liquid discharge pipe through which the treated liquid is discharged from the buffer tank;

a pump that is attached to the treated-liquid discharge pipe and delivers the treated liquid;

an on-off valve that is attached to the treated-liquid discharge pipe downstream of the pump and opens and closes the treated-liquid discharge pipe; and a circulation pipe that diverges from the treated-liquid discharge pipe between the pump and the on-off valve and returns the treated liquid flowing through the treated-liquid discharge pipe to the buffer tank.

10. The resistivity regulating apparatus according to claim 9, wherein the buffer tank has a circulation port through which the treated liquid is fed from the circulation pipe, and the circulation port is formed in an upper part of the buffer tank.

11. A resistivity regulating apparatus comprising:

a gas dissolving device that causes a regulating gas to dissolve in an ultrapure water targeted for resistivity regulation to generate a treated liquid in which the regulating gas is dissolved in the ultrapure water, the regulating gas being used to regulate a resistivity of the ultrapure water;

a buffer tank to which the treated liquid discharged from the gas dissolving device is fed;

a first regulation pipe through which the ultrapure water is fed to the buffer tank;

a second regulation pipe through which a regulating gas-saturated liquid in which the regulating gas is dissolved in the ultrapure water in a saturated state is fed to the buffer tank; and a resistivity sensor that measures a resistivity of the treated liquid in the buffer tank;

wherein the gas dissolving device includes:

a hollow fiber membrane module in which a hollow fiber membrane separates a liquid phase-side region fed with the ultrapure water from a gas phase-side region fed with the regulating gas and in which the regulating gas having passed through the hollow fiber membrane is dissolved in the ultrapure water in a saturated state to generate the regulating gas-saturated liquid;

a liquid feed pipe through which the ultrapure water is fed;

a module feed pipe that communicates with the liquid feed pipe through a diversion section at which the module feed pipe diverges from the liquid feed pipe so as to feed the ultrapure water to the hollow fiber membrane module;

a module discharge pipe through which the regulating gas-saturated liquid is discharged from the hollow fiber membrane module;

a bypass pipe that communicates with the liquid feed pipe through the diversion section and bypasses the hollow fiber membrane module; and a liquid discharge pipe that communicates with the module discharge pipe and the bypass pipe through a merge section at which the module discharge pipe merges with the bypass pipe.

12. The resistivity regulating apparatus according to claim 11, wherein the first regulation pipe is connected to the liquid feed pipe or the bypass pipe, and the second regulation pipe is connected to the module discharge pipe.

13. A resistivity regulating method using the resistivity regulating apparatus of claim 1, comprising:

causing a regulating gas to dissolve in a liquid targeted for resistivity regulation to generate a treated liquid in which the regulating gas is dissolved in the liquid, the regulating gas being used to regulate a resistivity of the liquid; and feeding the generated treated liquid to a buffer tank.

* * * * *